United States Patent
Sumi

(10) Patent No.: US 6,723,016 B2
(45) Date of Patent: Apr. 20, 2004

(54) TORQUE SPLIT INFINITELY VARIABLE TRANSMISSION

(75) Inventor: Yasuo Sumi, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/254,870

(22) Filed: Sep. 26, 2002

(65) Prior Publication Data

US 2003/0060318 A1 Mar. 27, 2003

(30) Foreign Application Priority Data

Sep. 27, 2001 (JP) .................................. 2001-296507

(51) Int. Cl.⁷ .............................................. F16H 37/02
(52) U.S. Cl. ...................................... 475/216; 475/211
(58) Field of Search ................................ 475/211, 215, 475/216, 217, 218

(56) References Cited

U.S. PATENT DOCUMENTS

| | | | | |
|---|---|---|---|---|
| 5,564,998 A | * | 10/1996 | Fellows | 475/216 |
| 6,251,038 B1 | * | 6/2001 | Ishikawa et al. | 475/216 |
| 6,306,059 B1 | * | 10/2001 | Yamada | 475/214 |
| 6,517,461 B2 | * | 2/2003 | Shimizu | 475/216 |

FOREIGN PATENT DOCUMENTS

| | | |
|---|---|---|
| JP | 9-210175 | 8/1997 |
| JP | 411303969 A * | 11/1999 |
| JP | 02002122206 A * | 4/2002 |

* cited by examiner

Primary Examiner—Roger Pang
(74) Attorney, Agent, or Firm—Foley & Lardner LLP

(57) ABSTRACT

In an infinitely variable transmission with a continuously variable transmission (CVT), a planetary gearset, a power recirculation mode clutch, and a direct mode clutch, a torque split mode reduction gear and clutch device is connected to a unit input shaft and located parallel to a power recirculation mode reduction gear and clutch device. The power recirculation mode clutch is provided for inputting a torque greater than a torque through the unit input shaft into the CVT with the power recirculation mode clutch engaged. The torque split mode clutch is provided for inputting a torque smaller than the torque through the unit input shaft into the CVT with the torque split mode clutch engaged. The power recirculation mode clutch, the direct mode clutch, and the torque split mode clutch are selectively engaged and disengaged for establishing either of a power recirculation mode, a direct mode, and a torque split mode.

8 Claims, 9 Drawing Sheets

TORQUE SPLIT INFINITELY VARIABLE TRANSMISSION

TECHNICAL FIELD

The present invention relates to an infinitely variable transmission for automotive vehicles, and particularly to a torque split infinitely variable transmission especially suitable for front-wheel-drive vehicles.

BACKGROUND ART

To meet demands for increased shift comfort, improved driveability, and reduced fuel consumption and exhaust emissions, there have been developed various continuously variable transmissions (often abbreviated to "CVTs") such as belt-drive CVTs and toroidal CVTs, in which a transmission ratio is steplessly variable within limits. In order to further enlarge a shifting range (a speed-change area), in other words, to widen the difference between the lowest transmission ratio and the highest transmission ratio of the CVT, in recent years, there have been proposed and developed infinitely variable transmissions (often abbreviated to "IVTs") capable of controlling a transmission ratio to infinity. One such infinitely variable transmission has been disclosed in Japanese Patent Provisional Publication No. 9-210175 (hereinafter is referred to as JP9-210175). In the infinitely variable transmission (IVT) as disclosed in JP9-210175, generally, input shafts of a continuously variable transmission and a first reduction gear unit, which are arranged parallel to each other, are connected to a unit input shaft (connected to an output shaft of an engine). A counter gear is used as a main part of the first reduction gear unit. A CVT output shaft and a power recirculation mode reduction gear unit are connected in parallel with each other. The output of the CVT and the output of the power recirculation mode reduction gear unit are input into a planetary gearset, and thereafter power is transmitted through a unit output shaft to axle drive shafts. The power recirculation mode reduction gear unit includes an input gear arranged coaxially with the unit input shaft, an output gear in meshed-engagement with the input gear and coaxially supported on the unit output shaft, and an output shaft that is rotatable at a preset reduction ratio of the power recirculation mode reduction gear unit. An output gear of the CVT meshingly engages via the counter gear of the first reduction gear unit with a gear of the CVT output shaft, such that the CVT output shaft rotates at the CVT transmission ratio based on engine speed and load. The CVT output shaft is connected to a sun gear of the planetary gearset. The output shaft of the power recirculation mode reduction gear unit is coupled to a single-planet-pinion carrier of the planetary gearset. A power recirculation mode clutch is interleaved between the output gear of the CVT and the output shaft of the power recirculation mode reduction gear unit. A ring gear of the planetary gearset is coupled to the unit output shaft of the IVT. A direct mode clutch is interleaved between the CVT output shaft and the IVT unit output shaft. In case of an infinitely variable transmission mounted on a front-wheel-drive vehicle, a differential, operatively connected to both the axle driveshafts, is accommodated in a transmission housing. A transmission output gear is attached to one end of the IVT unit output shaft such that the transmission output gear meshingly engages a final gear of the differential so as to continuously transmit power (driving torque) from the differential to both the axle driveshafts at a predetermined overall reduction ratio while permitting speed differentiation therebetween. The IVT is operable in a selected one of at least two operating modes, namely a CVT direct mode and a power recirculation mode. Disengaging the power recirculation mode clutch and engaging the direct mode clutch establish the CVT direct mode. During the CVT direct mode, the output is made according to only the CVT transmission ratio of the continuously variable transmission. On the other hand, engaging the power recirculation mode clutch and disengaging the direct mode clutch establish the power recirculation mode. During the power recirculation mode, depending on both the CVT transmission ratio and the reduction ratio of the power recirculation mode reduction gear unit, a so-called unit transmission ratio of the IVT is able to continuously vary from a negative ratio via a zero IVT output speed point (corresponding to IVT speed ratio=0 or IVT unit transmission ratio=∞) to a positive ratio. In the conventional infinitely variable transmission as disclosed in JP9-210175, at straight-ahead high-speed driving of the vehicle, the IVT is operated in the CVT direct mode. Thus, a fuel consumption rate is directly affected by a transmission efficiency of the CVT. At high load operation, the transmission efficiency of the CVT tends to be less than that of a standard planetary-gear equipped automatic transmission. This leads to the problem of deteriorated total fuel consumption rate of the infinitely variable transmission during high-speed driving. On IVTs, it would be desirable to improve fuel economy by enhancing the transmission efficiency of the IVT during high-speed driving.

SUMMARY OF THE INVENTION

Accordingly, it is an object of the invention to provide a torque split infinitely variable transmission, which avoids the aforementioned disadvantages.

In order to accomplish the aforementioned and other objects of the present invention, a torque split infinitely variable transmission comprises a continuously variable transmission connected to a unit input shaft of the infinitely variable transmission, a power recirculation mode reduction gear unit connected to the unit input shaft, a torque split mode reduction gear unit connected to the unit input shaft, a planetary gearset comprising a first member coupled to an output shaft of the continuously variable transmission, a second member coupled to a common output shaft common to the power recirculation mode reduction gear unit and the torque split mode reduction gear unit, and a third member coupled to a unit output shaft of the infinitely variable transmission, a power recirculation mode clutch interleaved between an output member of the power recirculation mode reduction gear unit and the common output shaft, for inputting a torque greater than a torque through the unit input shaft into the continuously variable transmission when the power recirculation mode clutch is engaged, a torque split mode clutch interleaved between an output member of the torque split mode reduction gear unit and the common output shaft, for inputting a torque smaller than the torque through the unit input shaft into the continuously variable transmission when the torque split mode clutch is engaged, a direct mode clutch interleaved between the output shaft of the continuously variable transmission and the unit output shaft of the infinitely variable transmission, for inputting the torque through the unit input shaft into the continuously variable transmission when the direct mode clutch is engaged, and the power recirculation mode clutch, the direct mode clutch, and the torque split mode clutch being selectively engaged and disengaged for establishing either of a power recirculation mode, a direct mode, and a torque split mode. It is preferable that the output shaft of the continuously variable transmission and the power recirculation mode reduction gear unit is connected in parallel with each other, and a torque split mode reduction gear and clutch device, including the torque split mode reduction gear unit and the torque split mode clutch, is arranged parallel to a power recirculation mode reduction gear and clutch device, including the power recirculation mode reduction gear unit and the power recirculation mode clutch. It is more preferable that a ratio R3/R13 of a reduction ratio R3 of the power recirculation mode reduction gear unit to a reduction ratio R13 of the torque split mode reduction gear unit is set to be equal to a ratio VLow/VHigh of a maximum transmission ratio VLow of the continuously variable transmission to a minimum transmission ratio VHigh of the continuously variable transmission. Preferably, the continuously variable transmission may comprise a toroidal continuously variable transmission, which has input and output disks coaxially arranged and opposing each other and a direction of rotation of the output disk is reversed relative to a direction of rotation of the input disk.

The other objects and features of this invention will become understood from the following description with reference to the accompanying drawings.

DESCRIPTION OF THE PREFERRED EMBODIMENTS

Figure 1:
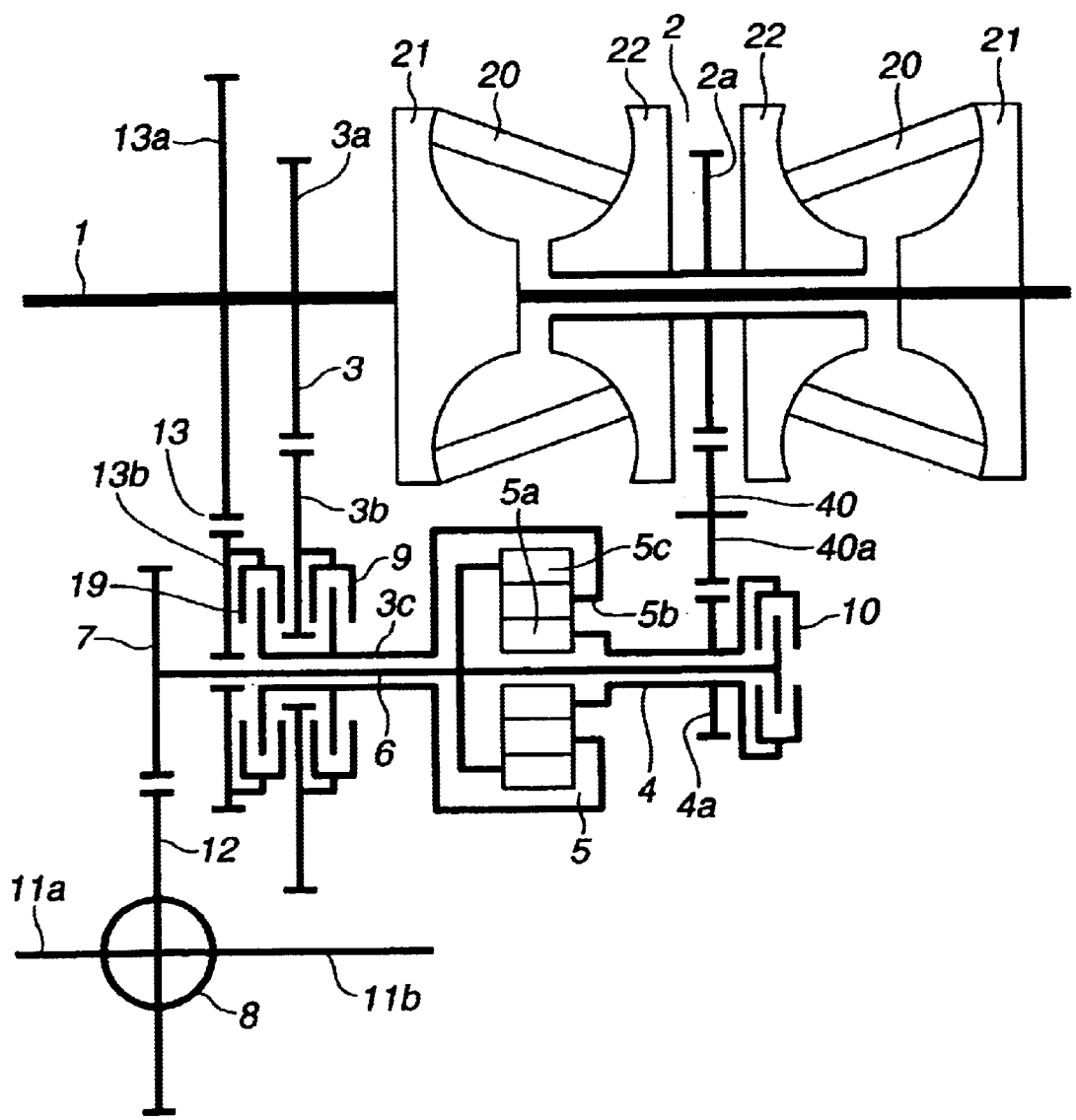
FIG. 1 is a skeleton diagram showing a torque split infinitely variable transmission (IVT) of a first embodiment.

Referring now to the drawings, particularly to FIG. 1, the torque split infinitely variable transmission (torque split IVT) of the first embodiment is exemplified in a toroidal CVT equipped IVT with a so-called double cavity type toroidal CVT 2 that has a pair of toroidal CVT mechanisms (or a pair of variator units) set in tandem and arranged in the interior space of a transmission housing. Each of the variator units is comprised of a pair of input and output disks 21 and 22 coaxially arranged and opposing each other, and a pair of power rollers 20. In such a toroidal CVT, the direction of rotation of CVT output disk 22 is in the opposite sense relative to that of CVT input disk 21. The torque split IVT of the first embodiment is applicable to front-wheel-drive vehicles. The construction of the torque split IVT of the first embodiment is somewhat similar to the IVT disclosed in JP9-210175. That is, input shafts of the double cavity type toroidal CVT 2 and a reduction gear unit or a reduction gearset 40, which are arranged parallel to each other, are connected to an IVT unit input shaft 1 (connected to an output shaft of an engine, i.e., an engine crankshaft). A counter gear 40a is used as a main part of reduction gear unit 40. An output shaft 4 of CVT 2 and a power recirculation mode reduction gear unit 3 are connected in parallel with each other. CVT output shaft 4 is coupled to a sun gear 5a of a planetary gearset 5, while an output shaft 3c of power recirculation mode reduction gear unit 3 is coupled to a single-planet-pinion carrier 5b of planetary gearset 5. Power is transmitted through an IVT unit output shaft 6 to axle driveshafts 11a and 11b. Power recirculation mode reduction gear unit 3 is comprised of an input gear (a first input gear) 3a coaxially arranged with IVT unit input shaft 1, an output gear (a first output gear) 3b in meshed-engagement with the input gear 3a and coaxially supported on IVT unit output shaft 6, and an output shaft 3c that is rotatable at a preset reduction ratio R3 (discussed later) of power recirculation mode reduction gear unit 3 during power recirculation mode. An output gear 2a of CVT 2 is coaxially arranged with and rotatably supported on IVT unit input shaft 1. Output gear 2a of CVT 2 meshingly engages via counter gear 40a of reduction gear unit 40 with a gear 4a of CVT output shaft 4, such that CVT output shaft 4 rotates at the CVT transmission ratio based on engine speed and load. In the first embodiment, gear 4a is coaxially arranged with sun gear 5a of planetary gearset 5. Generally, output gear 2a of CVT 2 is fixedly connected to a cylindrical hollow output shaft member that is integrally formed with or integrally connected to the inner peripheries of output disks 22 of CVT 2. A power recirculation mode clutch 9 is interleaved between output gear 3b and output shaft 3c. A direct mode clutch 10 is interleaved between CVT output shaft 4 and IVT unit output shaft 6. A differential 8, operatively connected to both axle driveshafts 11a and 11b, is accommodated in the transmission housing. A transmission output gear 7 is attached to one end of IVT unit output shaft 6 such that transmission output gear 7 meshingly engages a final gear 12 of differential 8 so as to continuously transmit power (driving torque) from the differential to both the axle driveshafts while permitting speed differentiation therebetween. The torque split IVT of the first embodiment is remarkably different from the IVT of JP9-210175, in that a torque split mode reduction gear and clutch device (including a torque split mode reduction gear unit 13 and a torque split mode clutch 19) are further interleaved between IVT unit input shaft 1 and output shaft 3c in such a manner that torque split mode reduction gear and clutch device (13, 19) is arranged parallel to a power recirculation mode reduction gear and clutch device (including power recirculation mode reduction gear unit 3 and power recirculation mode clutch 9) interleaved between IVT unit input shaft 1 and output shaft 3c. Output shaft 3c serves as a common output shaft common to power recirculation mode reduction gear unit 3 and torque split mode reduction gear unit 13. That is, torque split mode reduction gear unit 13 and power recirculation mode reduction gear unit 3, located parallel to each other, are connected between IVT unit input shaft 1 and common output shaft 3c. Torque split mode reduction gear unit 13 is comprised of an input gear (a second input gear) 13a arranged coaxially with IVT unit input shaft 1, an output gear (a second output gear) 13b in meshed-engagement with the input gear 13a and coaxially supported on IVT unit output shaft 6, and common output shaft 3c that is rotatable at a preset reduction ratio R13 (discussed later) of torque split mode reduction gear unit 13 during torque split mode. In the first embodiment, the first and second output gears 3b and 13b are coaxially arranged with single-planet-pinion carrier 5b of planetary gearset 5. As described later, power recirculation mode clutch 9 serves to input a torque greater than a torque through IVT unit input shaft 1 via the planetary gearset into CVT 2 when clutch 9 is engaged during the power recirculation mode. On the other hand, torque split mode clutch 19 serves to input a torque smaller than a torque through IVT unit input shaft 1 via the planetary gearset into CVT 2 when clutch 19 is engaged during the torque split mode. By way of addition of torque split mode reduction gear and clutch device (13, 19) located parallelly with power recirculation mode reduction gear and clutch device (3, 9), a torque split mode (fully described later), which ensures a relatively high transmission efficiency and contributes to reduced fuel consumption, can be established.

With the previously-discussed arrangement, the torque split IVT of the first embodiment shown in FIG. 1 is operable at a selected one of three different operating modes, namely a power recirculation mode, a CVT direct mode (simply, a direct mode), and a torque split mode. Actually, in the torque split IVT of the first embodiment, the driving torque input into IVT unit input shaft 1 is parallelly transmitted to each of CVT 2, power recirculation mode reduction gear unit 3, and torque split mode reduction gear unit 13. The driving torque input into CVT 2 is transmitted via counter gear 40a in meshed-engagement with CVT output gear 2a to gear 4a coaxially arranged with sun gear 5a. On the other hand, the driving torque input into each of power recirculation mode reduction gear unit 3 and torque split mode reduction gear unit 13 is transmitted via first and second input gears 3a and 13a to first and second output gears 3b and 13b coaxially arranged with single-planet-pinion carrier 5b. Single-planet-pinion carrier 5b of planetary gearset 5 is properly driven depending upon engaging and disengaging states of power recirculation mode clutch 9 and torque split mode clutch 19. In the first embodiment, owing to the use of counter gear 40a and the toroidal type of CVT 2, the direction of rotation of sun gear 5a is in the same sense relative to that of carrier 5b and reversed relative to that of IVT unit input shaft 1.

The power recirculation mode is established by engaging power recirculation mode clutch 9 and disengaging both torque split mode clutch 19 and direct mode clutch 10. Assuming that a direction of rotation of a rotating part, for example counter gear 40a, is in the opposite sense relative to that of IVT unit input shaft 1 and additionally the rotation direction of IVT unit input shaft 1 is defined as a positive direction, the rotation direction of the rotating part is defined as a negative direction. In the power recirculation mode position, input rotation having a direction opposite to the rotation direction of IVT unit input shaft 1 is transferred to single-planet-pinion carrier 5b of planetary gearset 5, since the input rotation is transmitted via power recirculation mode reduction gear unit 3 located between IVC unit input shaft 1 and carrier 5b. Thus, a revolution speed (a speed Nc) of carrier 5b is represented by the following expression (1).

$$Nc = -Nin/R3 \tag{1}$$

where Nin denotes a revolution speed of IVT unit input shaft 1, and R3 denotes a reduction ratio of power recirculation mode reduction gear unit 3.

In the power recirculation mode position, the direction of rotation of sun gear 5a that is coupled to CVT output shaft 4 is also in the opposite sense relative to that of IVT unit input shaft 1, since CVT 2 is the toroidal CVT and the input rotation transmitted to CVT output gear 2a is transferred via counter gear 40a to CVT output shaft 4. Thus, a revolution speed (a speed Ns) of sun gear 5a is represented by the following expression (2).

$$Ns = -Nin/(V \cdot R1) \tag{2}$$

where Nin denotes the IVT unit input shaft speed, V denotes a CVT transmission ratio of CVT 2, and R1 denotes a reduction ratio of reduction gear unit 40, that is, a reduction ratio of a reduction gearset comprised of CVT output gear 2a, counter gear 40a, and gear 4a of CVT output shaft 4.

A revolution speed (a speed Nout) of IVT unit output shaft 6 is represented by the following expression (3), because IVT unit output shaft 6 is coupled to ring gear 5c of the planetary gearset.

$$Nout = -\{(1+\alpha)/R3 - \alpha/(V \cdot R1)\} \cdot Nin \tag{3}$$

where Nin denotes the IVT unit input shaft speed, V denotes the CVT transmission ratio of CVT 2, R1 denotes the reduction ratio of reduction gear unit 40, R3 denotes the reduction ratio of power recirculation mode reduction gear unit 3, and α denotes a ratio of the number of teeth of sun gear 5a to the number of teeth of ring gear 5c, that is, a reduction ratio of planetary gearset 5.

A revolution speed (an axle driveshaft speed Nf) is represented by the following expression (4). Axle driveshaft speed Nf corresponds to an axle driveshaft speed produced when differential 8 is in its locked state and thus left and right axle driveshafts 11a and 11b are same in rotational speed.

$$\begin{aligned} Nf &= -Nout/Rf \\ &= \{(1+\alpha)/R3 - \alpha/(V \cdot R1)\} \cdot Nin/Rf \end{aligned} \tag{4}$$

where Nin denotes the IVT unit input shaft speed, V denotes the CVT transmission ratio, R1 denotes the reduction ratio of reduction gear unit 40, R3 denotes the reduction ratio of power recirculation mode reduction gear unit 3, α denotes the ratio of the number of teeth of sun gear 5a to the number of teeth of ring gear 5c, and Rf denotes a final gear ratio of final gear 12.

Figure 2:
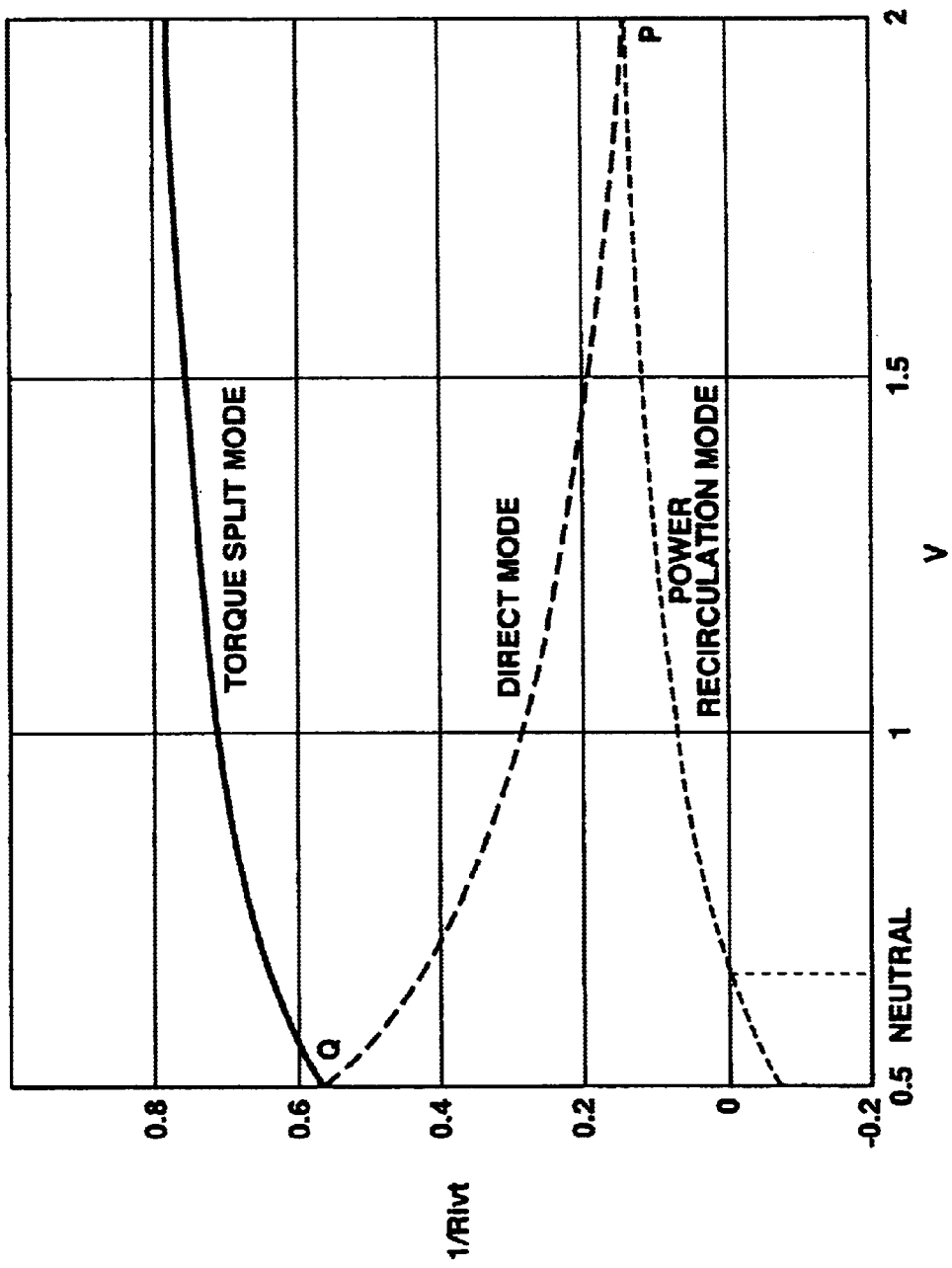
FIG. 2 shows characteristic curves of an inverse 1/Rivt of an IVT unit transmission ratio (a unit overall transmission ratio Rivt) based on both a CVT transmission ratio V and a final gear ratio, at each of three different operating modes, namely a torque split mode, a CVT direct mode, and a power recirculation mode, obtained in the torque split IVT of the first embodiment.

Therefore, as can be seen from the power recirculation mode V-(1/Rivt) characteristic curve indicated by the lowermost broken line in FIG. 2, when downshifting the CVT transmission ratio V from the speed-increasing side (the highest speed-change ratio of the CVT) to the speed-decreasing side (the lowest speed-change ratio of the CVT) in the power recirculation mode, unit overall transmission ratio Rivt that the final gear ratio is taken into account, can be smoothly changed from a reverse-rotation gear ratio (a negative gear ratio, i.e., Rivt<0) via a geared neutral point often abbreviated to "GNP" (at which the output speed of the torque split IVT is zero and thus the vehicle is in a stopped state, in other words, Rivt=∞) to a normal-rotation gear ratio (a positive gear ratio, i.e., Rivt>0). During shifting from the speed-increasing side to the speed-decreasing side in the power recirculation mode position, shifting can be made until unit overall transmission ratio Rivt reaches a first mode switching point P, which will be hereinafter referred to as a "first revolution synchronous point" abbreviated to "$1^{ST}$ RSP". In the power recirculation mode V-(1/Rivt) characteristic curve shown in FIG. 2, the inverse 1/Rivt of unit overall transmission ratio Rivt corresponds to axle driveshaft speed Nf obtained when IVT unit input shaft speed is equal to 1, that is, Nin=1. Additionally, the power recirculation mode characteristic indicated by the lowermost broken line in FIG. 2 shows an example obtained under a particular condition wherein CVT transmission ratio V, and reduction ratios R1, R3, Rf, and α of the reduction gearsets are set as follows.

V=0.5~2.0

R1=1.0

R3=2.0

Rf=3.5

α=0.5

Note that the set value (=2.0>1) of reduction ratio R3 of power recirculation mode reduction gear unit 3 means a speed-decreasing function, in other words, a torque-increasing function). That is, the output torque from power recirculation mode reduction gear unit 3 is increased relative to the torque through IVT unit input shaft 1.

In contrast to the above, the CVT direct mode is established by disengaging both power recirculation mode clutch 9 and torque split mode clutch 19 and engaging direct mode clutch 10. In the CVT direct mode, each of power recirculation mode reduction gear unit 3, torque split mode reduction gear unit 13, and planetary gearset 5 is disengaged or uncoupled from the power-transmission line. Thus, IVT unit output shaft speed Nout is represented by the following expression (5), while axle driveshaft speed Nf is represented by the following expression (6).

$$N\text{out}=-N\text{in}/(V \cdot R1) \qquad (5)$$

$$Nf=N\text{in}/(V \cdot R1 \cdot Rf) \qquad (6)$$

That is, as can be seen from the direct mode V-(1/Rivt) characteristic curve indicated by the intermediate broken line in FIG. 2, when upshifting the CVT transmission ratio V from the speed-decreasing side (the lowest speed-change ratio VLow of the CVT) to the speed-increasing side (the highest speed-change ratio VHigh of the CVT) in the CVT direct mode under a particular condition of Nin=1, axle driveshaft speed Nf can be continuously changed within a range between a value 1/(VLow·R1·Rf) corresponding to the lowest speed-change ratio VLow (in other words, the maximum transmission ratio of CVT 2) and a value 1/(VHigh·R1·Rf) corresponding to the highest speed-change ratio VHigh (in other words, the minimum transmission ratio of CVT 2).

On the other hand, the torque split mode is established by engaging torque split mode clutch 19 and disengaging both power recirculation mode clutch 9 and direct mode clutch 10. In the torque split mode position, input rotation, reversed by torque split mode reduction gear 13 and thus having a direction opposite to the rotation direction of IVT unit input shaft 1, is transferred to single-planet-pinion carrier 5b. Thus, carrier speed Nc is represented by the following expression (7).

$$Nc=-N\text{in}/R13 \qquad (7)$$

where Nin denotes the IVT unit input shaft speed, and R13 denotes a reduction ratio of torque split mode reduction gear unit 13.

In the torque split mode position, the rotation direction of sun gear 5a that is coupled to CVT output shaft 4 is opposite to the rotation direction of IVT unit input shaft 1, since CVT 2 is the toroidal CVT and the input rotation transmitted to CVT output gear 2a is transferred via counter gear 40a to CVT output shaft 4. Thus, a revolution speed (a speed Ns) of sun gear 5a is represented by the following expression (8).

$$Ns=-N\text{in}/(V \cdot R1) \qquad (8)$$

where Nin denotes the IVT unit input shaft speed, V denotes the CVT transmission ratio of CVT 2, and R1 denotes the reduction ratio of reduction gear unit 40.

A revolution speed (a speed Nout) of IVT unit output shaft 6 is represented by the following expression (9), because IVT unit output shaft 6 is coupled to ring gear 5c of the planetary gearset.

$$N\text{out}=-\{(1+\alpha)/R13-\alpha/(V \cdot R1)\} \cdot N\text{in} \qquad (9)$$

where Nin denotes the IVT unit input shaft speed, V denotes the CVT transmission ratio of CVT 2, R1 denotes the reduction ratio of reduction gear unit 40, R13 denotes the reduction ratio of torque split mode reduction gear unit 13, and α denotes a ratio of the number of teeth of sun gear 5a to the number of teeth of ring gear 5c, that is, a reduction ratio of planetary gearset 5.

A revolution speed (an axle driveshaft speed Nf) is represented by the following expression (10).

$$Nf = -N\text{out}/Rf \qquad (10)$$
$$= \{(1+\alpha)/R13 - \alpha/(V \cdot R1)\} \cdot N\text{in}/Rf$$

where Nin denotes the IVT unit input shaft speed, V denotes the CVT transmission ratio, R1 denotes the reduction ratio of reduction gear unit 40, R13 denotes the reduction ratio of torque split mode reduction gear unit 13, α denotes the ratio of the number of teeth of sun gear 5a to the number of teeth of ring gear 5c, and Rf denotes a final gear ratio of final gear 12.

Therefore, as can be seen from the torque split mode V-(1/Rivt) characteristic curve indicated by the uppermost solid line in FIG. 2 and located above the direct mode V-(1/Rivt) characteristic curve indicated by the intermediate broken line in FIG. 2, when downshifting the CVT transmission ratio V from the speed-increasing side (the highest speed-change ratio of the CVT) to the speed-decreasing side (the lowest speed-change ratio of the CVT) in the torque split mode, unit overall transmission ratio Rivt can be smoothly changed from the highest gear ratio of the CVT direct mode to a higher gear ratio exceeding the highest gear ratio of the CVT direct mode. The highest gear ratio of the CVT direct mode corresponds to a second mode switching point Q (which will be hereinafter referred to as a "second revolution synchronous point" abbreviated to "$2^{ND}$ RSP") at which switching between the CVT direct mode and the torque split mode is made. In the torque split mode V-(1/Rivt) characteristic indicated by the uppermost broken line in FIG. 2 shows an example obtained under a particular condition wherein CVT transmission ratio V, and reduction ratios R1, R13, Rf, and α of the reduction gearsets are set as follows.

$$V=0.5\sim2.0$$

$$R1=1.0$$

$$R13=0.5$$

$$Rf=3.5$$

$$\alpha=0.5$$

Note that the set value (=0.5<1) of reduction ratio R13 of torque split mode reduction gear unit 13 means a speed-increasing function, in other words, a torque-decreasing function). That is, the output torque from torque split mode reduction gear unit 13 is decreased relative to the torque through IVT unit input shaft 1.

At the first revolution synchronous point P between the power recirculation mode and the CVT direct mode, a unit transmission ratio Nin/Nout for the CVT direct mode is represented by the following expression (11), whereas a unit transmission ratio Nin/Nout for the power recirculation mode is represented by the following expression (12).

$$Nin/Nout=-V\text{Low} \cdot R1 \quad (11)$$

$$Nin/Nout=-1/\{(1+\alpha)/R3-\alpha/(V\text{Low} \cdot R1)\} \quad (12)$$

At the first revolution synchronous point P, the right side (i.e., $-V\text{Low} \cdot R1$) of the expression (11) is equal to the right side (i.e., $-1/\{(1+\alpha)/R3-\alpha/(V\text{Low} \cdot R1)\}$) of the expression (12). Thus, the following equation (13) is satisfied.

$$-V\text{Low} \cdot R1 = -1/\{(1+\alpha)/R3-\alpha/(V\text{Low} \cdot R1)\} \quad (13)$$

$$(V\text{Low} \cdot R1) \cdot \{(1+\alpha)/R3-\alpha/(V\text{Low} \cdot R1)\} = 1$$

$$(V\text{Low} \cdot R1)(1+\alpha)/R3 = 1+\alpha$$

$$\therefore V\text{Low} = R3/R1$$

At the second revolution synchronous point Q between the CVT direct mode and the torque split mode, a unit transmission ratio Nin/Nout for the CVT direct mode is represented by the following expression (14), whereas a unit transmission ratio Nin/Nout for the torque split mode is represented by the following expression (15).

$$Nin/Nout=-V\text{High} \cdot R1 \quad (14)$$

$$Nin/Nout=-1/\{((1+\alpha)/R13-\alpha/(V\text{High} \cdot R1)\} \quad (15)$$

At the second revolution synchronous point Q, the right side (i.e., $-V\text{High} \cdot R1$) of the expression (14) is equal to the right side (i.e., $-1/\{(1+\alpha)/R13-\alpha/(V\text{High} \cdot R1)\}$) of the expression (15). Thus, the following equation (16) is satisfied.

$$-V\text{High} \cdot R1 = -1/\{(1+\alpha)/R13-\alpha/(V\text{High} \cdot R1)\} \quad (16)$$

$$(V\text{High} \cdot R1) \cdot \{(1+\alpha)/R13-\alpha/(V\text{High} \cdot R1)\} = 1$$

$$(V\text{High} \cdot R1)(1+\alpha)/R13 = 1+\alpha$$

$$\therefore V\text{High} = R13/R1$$

The following expression (17) is satisfied based on both the expressions (13) and (16).

$$V\text{Low}/V\text{High}=R3/R13 \quad (17)$$

Figure 3:
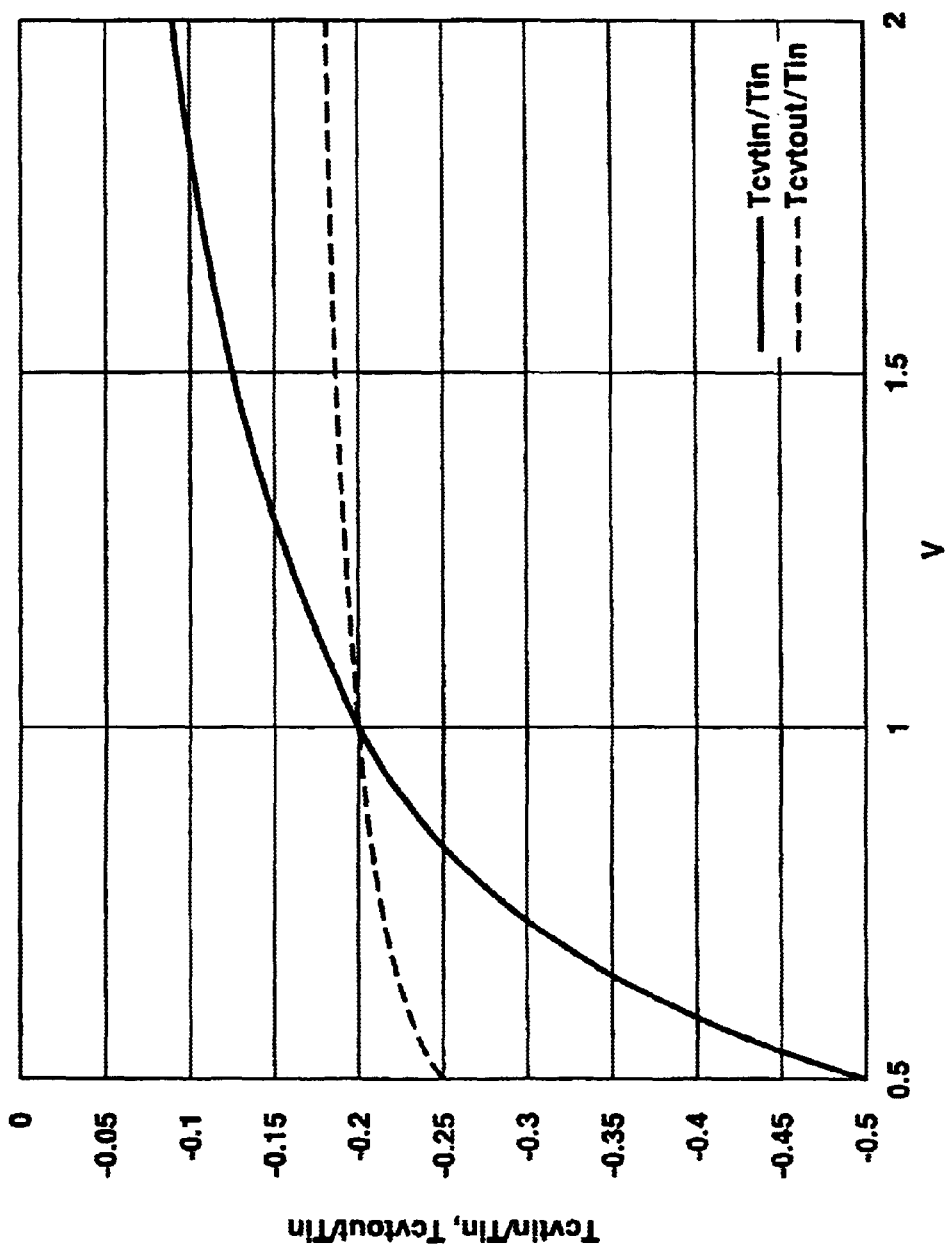
FIG. 3 shows a CVT transmission ratio V versus CVT input shaft torque characteristic and a CVT transmission ratio V versus CVT output shaft torque characteristic, obtained when the torque split IVT of the first embodiment is operating in the torque split mode.

As can be appreciated from the expression (17), in the torque split IVT of the first embodiment shown in FIGS. 1–3, it is possible to match the unit transmission ratio Nin/Nout of the CVT direct mode to the unit transmission ratio Nin/Nout of the power recirculation mode at the lowest speed-change ratio VLow (in other words, the maximum CVT transmission ratio) by optimally setting reduction ratio R3 of power recirculation mode reduction gear unit 3, and reduction ratio R13 of torque split mode reduction gear unit 13, so that the ratio R3/R13 of reduction ratio R3 of power recirculation mode reduction gear unit 3 to reduction ratio R13 of torque split mode reduction gear unit 13 is identical to the ratio VLow/VHigh of the lowest speed-change ratio VLow to the highest speed-change ratio VHigh. Likewise, by way of the same optimal ratio setting defined by VLow/VHigh=R3/R13, it is possible to match the unit transmission ratio Nin/Nout of the CVT direct mode to the unit transmission ratio Nin/Nout of the torque split mode at the highest speed-change ratio VHigh (in other words, the CVT minimum transmission ratio). In other words, the previously-noted optimal ratio setting defined by VLow/VHigh=R3/R13, ensures smooth switching between the power recirculation mode and the CVT direct mode with no difference of unit transmission ratio Nin/Nout, and also ensures smooth switching between the CVT direct mode and the torque split mode with no difference of unit transmission ratio Nin/Nout. That is, according to the torque split IVT of the first embodiment shown in FIGS. 1–3, it is possible to remarkably effectively increase or widen the width of unit overall transmission ratio Rivt of the torque split IVT, while making best use of a CVT transmission ratio range from the lowest CVT speed-change ratio VLow to the highest CVT speed-change ratio VHigh at each of the power recirculation mode, the CVT direct mode, and the torque split mode.

In addition to the above, in the torque split mode position, the shaft torque is transmitted from IVT unit input shaft 1 through CVT 2 and torque split mode reduction gear unit 13 arranged parallel to CVT 2 to planetary gearset 5. Assuming that the incoming shaft torque (CVT input shaft torque) input into the input disk 21 of CVT 2 is denoted by Tcvtin, whereas the outgoing shaft torque (CVT output shaft torque) output from the output disk 22 of CVT 2 is denoted by Tcvtout, these torques Tcvtin and Tcvtout are respectively represented by the following expressions (18) and (19).

$$T\text{cvtin}=\alpha \cdot R13 \cdot Tin/\{\alpha \cdot R13-(1+\alpha) \cdot V \cdot R1\} \quad (18)$$

$$T\text{cvtout}=\alpha \cdot R13 \cdot Tin \cdot V/\{\alpha \cdot R13-(1+\alpha) \cdot V \cdot R1\} \quad (19)$$

where V denotes the CVT transmission ratio, R1 denotes the reduction ratio of reduction gear unit 40, R13 denotes the reduction ratio of torque split mode reduction gear unit 13, α denotes the reduction ratio of planetary gearset 5, and Tin denotes a unit input shaft torque whose sign is positive when the unit input shaft torque flows from input disk 21 of CVT 2 to output disk 22 of CVT 2. On the assumption that reduction ratio α of planetary gearset 5, reduction ratio R1 of reduction gear unit 40, and reduction ratio R13 of torque split mode reduction gear unit 13 are respective set at 0.5, 1.0 and 0.5, if CVT transmission ratio V is 0.5 (corresponding to the highest speed-change ratio VHigh) with these set values (α=0.5, R1=1.0, R13=0.5) substituted into the previously-noted expressions (18) and (19), the following relational expressions are satisfied.

Tcvtin/Tin=−0.5

Tcvtout/Tin=−0.25

If CVT transmission ratio V is 2.0 (corresponding to the lowest speed-change ratio VLow) with the same set values (α=0.5, R1=1.0, R13=0.5), the following relational expressions are satisfied.

Tcvtin/Tin=−0.25/2.75≈−0.0909

Tcvtout/Tin=−0.5/2.75≈−0.1818

The characteristic curve indicated by the solid line in FIG. 3 is the CVT transmission ratio V versus CVT input shaft torque characteristic curve showing how the ratio Tcvtin/Tin of the incoming shaft torque Tcvtin to unit input shaft torque Tin varies relative to CVT transmission ratio V (ranging from 0.5 to 2.0). On the other hand, the characteristic curve indicated by the broken line in FIG. 3 is the CVT transmission ratio V versus CVT output shaft torque characteristic curve showing how the ratio Tcvtout/Tin of the outgoing shaft torque Tcvtout to unit input shaft torque Tin varies relative to CVT transmission ratio V. As can be seen from the two characteristic curves of FIG. 3, namely the V-Tcvtin/Tin curve indicated by the solid line and the V-Tcvtout/Tin curve indicated by the broken line, the values Tcvtin/Tin and Tcvtout/Tin are both negative all over the CVT transmission ratio V ranging from 0.5 to 2.0. As can be appreciated from the negative Tcvtin/Tin value and the negative Tcvtout/Tin value in FIG. 3, during the torque split mode, back torque flow occurs such that the torque flows from output disk 22 back to input disk 21. As can be seen from the Tcvtout/Tin curve indicated by the broken line in FIG. 3, the Tcvtout/Tin value is approximately −0.25 at the highest speed-change ratio VHigh (=0.5) of CVT 2 and the Tcvtout/Tin value is approximately −0.18 at the lowest speed-change ratio VLow (=2.0) of CVT 2. That is, approximately 18 to 25% shaft torque of unit input shaft torque Tin is transmitted in a direction of input disk 21. Therefore, in the torque split mode, the shaft torque (=(Tin−Tcvtin)·R13) that is obtained by multiplying the difference (Tin−Tcvtin) between unit input shaft torque Tin of IVT unit input shaft 1 and CVT input shaft torque Tcvtin of input disk 21 by reduction ratio R13 of torque split mode reduction gear unit 13 is applied to single-planet-pinion carrier 5b. At the same time, the shaft torque (=Tcvtout·R1) that is obtained by multiplying CVT output shaft torque Tcvtout of output disk 22 by reduction ratio R1 of reduction gear unit 40 is applied to sun gear 5a. As a result, the sum (=(Tin−Tcvtin)·R13+Tcvtout·R1) of the previously-noted two shaft torques is transmitted via ring gear 5c to IVT unit output shaft 6. Thus, the shaft torque Tout transmitted to IVT unit output shaft 6 is represented by the following expression (20), utilizing the previously-noted expressions (18) and (19).

$$Tout = (Tin - Tcvtin) \cdot R13 + Tcvtout \cdot R1 \quad (20)$$

$$= [Tin - \alpha \cdot R13 \cdot Tin / \{\alpha \cdot R13 - (1+\alpha) \cdot V \cdot R1\}] \cdot R13 +$$

$$[\alpha \cdot R13 \cdot Tin \cdot V / \{\alpha \cdot R13 - (1+\alpha) \cdot V \cdot R1\}] \cdot R1$$

$$= V \cdot R1 \cdot R13 \cdot Tin \cdot [\{\alpha \cdot R13 - (1+\alpha) \cdot V \cdot R1\} -$$

$$\alpha \cdot R13 + \alpha \cdot V \cdot R1] / \{\alpha \cdot R13 - (1+\alpha) \cdot V \cdot R1\} \cdot V \cdot R1$$

$$= V \cdot R1 \cdot R13 \cdot Tin \cdot (-V \cdot R1) / \{\alpha \cdot R13 -$$

$$(1+\alpha) \cdot V \cdot R1\} \cdot V \cdot R1$$

$$= V \cdot R1 \cdot R13 \cdot Tin / \{(1+\alpha) \cdot V \cdot R1 - \alpha \cdot R13\}$$

On the assumption that reduction ratio α of planetary gearset 5, reduction ratio R1 of reduction gear unit 40, and reduction ratio R13 of torque split mode reduction gear unit 13 are respective set at 0.5, 1.0 and 0.5, if CVT transmission ratio V is 0.5 (corresponding to the highest speed-change ratio VHigh) with these set values (α=0.5, R1=1.0, R13=0.5) substituted into the previously-noted expression (20), the following relational expression is satisfied.

Tout/Tin=0.5

If CVT transmission ratio V is 2.0 (corresponding to the lowest speed-change ratio VLow) with the same set values (α=0.5, R1=1.0, R13=0.5), the following relational expression is satisfied.

Tout/Tin=1.0/2.75≈0.3636

The transmission efficiency of CVT 2 is generally lower than that of a standard planetary-gear equipped automatic transmission. For instance, assuming that the transmission efficiency of CVT 2 is 92%, the transmission efficiency of reduction gear unit 40 is 97%, the transmission efficiency of torque split mode reduction gear unit 13 is 98.5%, and the transmission efficiency of planetary gearset 5 is 99%, a total transmission efficiency of the power train (power transmission line) between IVT unit input shaft 1 and IVT unit output shaft 6 in the CVT direct mode is calculated as the product (0.92×0.97=89.2%) of the transmission efficiency (92%) of CVT 2 and the transmission efficiency (97%) of reduction gear unit 40. In the torque split mode position, for instance, when CVT transmission ratio V is 0.5 (corresponding to the highest speed-change ratio VHigh), that is, the ratio Tout/Tin of the IVT unit output shaft torque Tout to the IVT unit input shaft torque Tin is 0.5, the total transmission efficiency of the power train (power transmission line) between IVT unit input shaft 1 and IVT unit output shaft 6 is calculated as follows. In case of V=0.5 (or Tout/Tin=0.5):

[1−{(1−0.92)×0.5+(1−0.97)×

0.5+(1−0.985)×1.51}]×0.99=92.3%

When CVT transmission ratio V is 2.0 (corresponding to the lowest speed-change ratio VLow), that is, the ratio Tout/Tin of the IVT unit output shaft torque Tout to the IVT unit input shaft torque Tin is 0.3636, the total transmission efficiency of the power train (power transmission line) between IVT unit input shaft 1 and IVT unit output shaft 6 is calculated as follows. In case of V=2.0 (or Tout/Tin=0.3636):

$$[1-\{(1-0.92)\times0.0909+(1-0.97)\times0.0909+(1-0.985)\times1.0909\}]\times$$
$$0.99=97.4\%$$

The total transmission efficiency (92.3%) obtained in torque split mode when V=0.5 (Tout/Tin=0.5) and the total transmission efficiency (97.4%) obtained in torque split mode when V=2.0 (Tout/Tin=0.3636) are both relatively higher than the total transmission efficiency (89.2%) obtained at the CVT direct mode.

Figure 4:
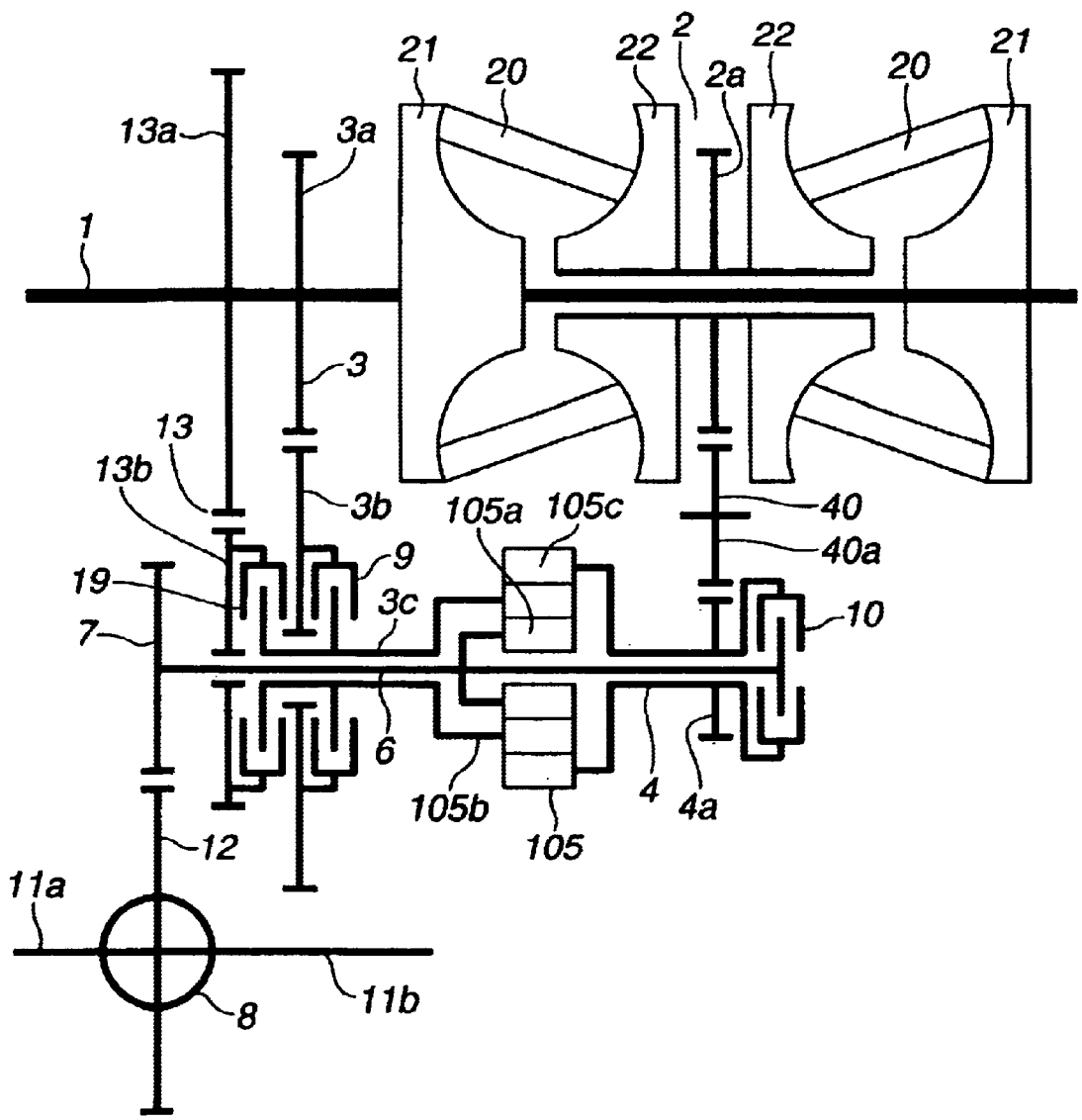
FIG. 4 is a skeleton diagram showing a torque split infinitely variable transmission (IVT) of a second embodiment.

Referring now to FIG. 4, there is shown the torque split infinitely variable transmission (IVT) of the second embodiment. As described previously, the torque split IVT of the first embodiment shown in FIG. 1 is designed so that input rotation transmitted from IVT unit input shaft 1 to power recirculation mode reduction gear unit 3 or torque split mode reduction gear unit 13 is transferred to single-planet-pinion carrier 5b, and input rotation transmitted from IVT unit input shaft 1 to CVT 2 is transferred to sun gear 5a, and output rotation is transferred from ring gear 5c to IVT unit output shaft 6. In contrast, in the torque split IVT of the second embodiment shown in FIG. 4, input rotation transmitted from IVT unit input shaft 1 to power recirculation mode reduction gear unit 3 or torque split mode reduction gear unit 13 is transferred to a single-planet-pinion carrier 105b of a planetary gearset 105, and input rotation transmitted from IVT unit input shaft 1 to CVT 2 is transferred to a ring gear 105c, and output rotation is transferred from sun gear 105a to IVT unit output shaft 6. That is, single-planet-pinion carrier 105b is coupled to output shaft 3c common to power recirculation mode reduction gear unit 3 and torque split mode reduction gear unit 13. Sun gear 105a is coupled to IVT unit output shaft 6, whereas ring gear 105c is coupled to CVT output shaft 4. Gear 4a of CVT output shaft 4 is arranged coaxially with ring gear 105c. In the second embodiment, gear 4a is coaxially arranged with ring gear 105c of planetary gearset 105, while the first and second output gears 3b and 13b are coaxially arranged with single-planet-pinion carrier 105b of planetary gearset 105.

With the previously-discussed arrangement, the torque split IVT of the second embodiment shown in FIG. 4 is operable at a selected one of three different operating modes, namely a power recirculation mode, a CVT direct mode, and a torque split mode. Actually, in the torque split IVT of the second embodiment, the driving torque input into IVT unit input shaft 1 is parallelly transmitted to each of CVT 2, power recirculation mode reduction gear unit 3, and torque split mode reduction gear unit 13. The driving torque input into CVT 2 is transmitted via counter gear 40a in meshed-engagement with CVT output gear 2a to gear 4a coaxially arranged with ring gear 105c. On the other hand, the driving torque input into each of power recirculation mode reduction gear unit 3 and torque split mode reduction gear unit 13 is transmitted via first and second input gears 3a and 13a to first and second output gears 3b and 13b coaxially arranged with single-planet-pinion carrier 105b. Carrier 105b of planetary gearset 105 is properly driven depending upon engaging and disengaging states of power recirculation mode clutch 9 and torque split mode clutch 19. In the second embodiment, owing to the use of counter gear 40a and the toroidal type of CVT 2, the direction of rotation of ring gear 105c is in the same sense relative to that of carrier 105b and reversed relative to that of IVT unit input shaft 1. In the power recirculation mode position in which power recirculation mode clutch 9 is engaged and torque split mode clutch 19 and direct mode clutch 10 are both disengaged, a direction of rotation of carrier 105b is in the opposite sense relative to that of IVT unit input shaft 1, since the input rotation is transmitted via power recirculation mode reduction gear unit 3 located between IVC unit input shaft 1 and carrier 105b. Thus, a revolution speed (a speed Nc) of carrier 105b is represented by the following expression (21).

$$Nc=-Nin/R3 \quad (21)$$

where Nin denotes an IVT unit input shaft speed, and R3 denotes a reduction ratio of power recirculation mode reduction gear unit 3.

In the power recirculation mode position, the direction of rotation of ring gear 105c that is coupled to CVT output shaft 4 is also in the opposite sense relative to that of IVT unit input shaft 1, since CVT 2 is the toroidal CVT and the input rotation transmitted to CVT output gear 2a is transferred via counter gear 40a to CVT output shaft 4. Thus, a revolution speed (a speed Nr) of ring gear 105c is represented by the following expression (22).

$$Nr=-Nin/(V\cdot R1) \quad (22)$$

where Nin denotes the IVT unit input shaft speed, V denotes the CVT transmission ratio of CVT 2, and R1 denotes the reduction ratio of reduction gear unit 40, that is, the reduction ratio of a reduction gearset comprised of CVT output gear 2a, counter gear 40a, and gear 4a of CVT output shaft 4.

IVT unit output shaft 6 is coupled to sun gear 105a of planetary gearset 105, and therefore a revolution speed (a speed Nout) of IVT unit output shaft 6 is represented by the following expression (23), whereas a revolution speed (an axle driveshaft speed Nf) is represented by the following expression (24).

$$Nout=-\{(1+\alpha)/(\alpha\cdot R3)-1/(\alpha\cdot V\cdot R1)\}\cdot Nin \quad (23)$$

$$Nf=\{(1+\alpha)/(\alpha\cdot R3)-1/(\alpha\cdot V\cdot R1)\}Nin/Rf \quad (24)$$

where Nin denotes the IVT unit input shaft speed, V denotes the CVT transmission ratio, R1 denotes the reduction ratio of reduction gear unit 40, R3 denotes the reduction ratio of power recirculation mode reduction gear unit 3, α denotes the reduction ratio of planetary gearset 105 (i.e., a ratio of the number of teeth of sun gear 105a to the number of teeth of ring gear 105c), and Rf denotes the final gear ratio of final gear 12.

Figure 5:
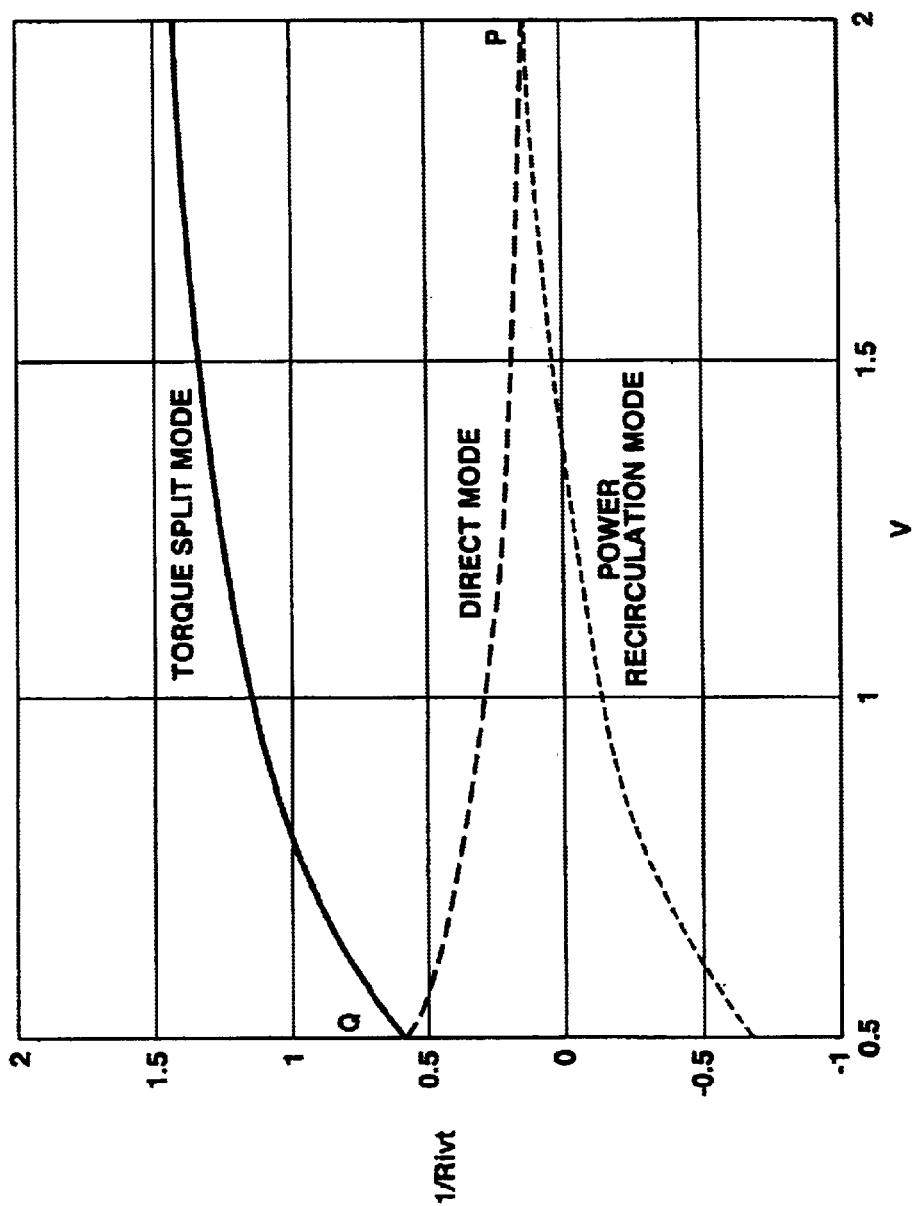
FIG. 5 shows characteristic curves of an inverse 1/Rivt of an IVT unit transmission ratio (a unit overall transmission ratio Rivt) based on both a CVT transmission ratio V and a final gear ratio, at each of three different operating modes, namely a torque split mode, a CVT direct mode, and a power recirculation mode, obtained in the torque split IVT of the second embodiment.

Therefore, as can be seen from the power recirculation mode V-(1/Rivt) characteristic curve indicated by the lowermost broken line in FIG. 5, when downshifting the CVT transmission ratio V from the speed-increasing side (the highest speed-change ratio of the CVT) to the speed-decreasing side (the lowest speed-change ratio of the CVT) in the power recirculation mode, unit overall transmission ratio Rivt can be smoothly changed from a reverse-rotation gear ratio (a negative gear ratio, i.e., Rivt<0) via a geared neutral point GNP (at which the output speed of the torque split IVT is zero and thus the vehicle is in a stopped state, in other words, Rivt=∞) to a normal-rotation gear ratio (a positive gear ratio, i.e., Rivt>0). During shifting from the speed-increasing side to the speed-decreasing side in the power recirculation mode position, shifting can be made until unit overall transmission ratio Rivt reaches a first revolution synchronous point P. FIG. 5 shows an example of each mode characteristic curve obtained under a particular condition wherein CVT transmission ratio V, and reduction ratios R1, R3, Rf, and α of the reduction gearsets are set in the same set values as the first embodiment shown in FIGS. 1–3.

In contrast, in CVT direct mode position in which power recirculation mode clutch 9 and torque split mode clutch 19 are disengaged and direct mode clutch 10 is engaged, each of power recirculation mode reduction gear unit 3, torque split mode reduction gear unit 13, and planetary gearset 105 is disengaged or uncoupled from the power-transmission line. Thus, IVT unit output shaft speed Nout is represented by the following expression (25), while axle driveshaft speed Nf is represented by the following expression (26).

$$Nout = -Nin/(V \cdot R1) \tag{25}$$

$$Nf = Nin/(V \cdot R1 \cdot Rf) \tag{26}$$

That is, as can be seen from the direct mode V-(1/Rivt) characteristic curve indicated by the intermediate broken line in FIG. 5, when upshifting the CVT transmission ratio V from the speed-decreasing side (the lowest speed-change ratio VLow) to the speed-increasing side (the highest speed-change ratio VHigh) in the CVT direct mode under a particular condition of Nin=1, axle driveshaft speed Nf can be continuously changed within a range between a value $1/(VLow \cdot R1 \cdot Rf)$ corresponding to the lowest speed-change ratio VLow and a value $1/(VHigh \cdot R1 \cdot Rf)$ corresponding to the highest speed-change ratio VHigh.

In the torque split mode position in which torque split mode clutch 19 is engaged and power recirculation mode clutch 9 and direct mode clutch 10 are both disengaged, a direction of rotation of carrier 105b is in the opposite sense relative to that of IVT unit input shaft 1, since the input rotation is transmitted via torque split mode reduction gear unit 13 located between IVC unit input shaft 1 and carrier 105b. Thus, Planet-pinion carrier speed Nc is represented by the following expression (27).

$$Nc = -Nin/R13 \tag{27}$$

where Nin denotes the IVT unit input shaft speed, and R13 denotes a reduction ratio of torque split mode reduction gear unit 13.

In the torque split mode position, the direction of rotation of ring gear 105c that is coupled to CVT output shaft 4 is in the opposite sense relative to that of IVT unit input shaft 1, since CVT 2 is the toroidal CVT and the input rotation transmitted to CVT output gear 2a is transferred via counter gear 40a to CVT output shaft 4. Thus, ring gear speed Nr is represented by the following expression (28).

$$Nr = -Nin/(V \cdot R1) \tag{28}$$

where Nin denotes the IVT unit input shaft speed, V denotes the CVT transmission ratio of CVT 2, and R1 denotes the reduction ratio of reduction gear unit 40.

IVT unit output shaft 6 is coupled to sun gear 105a of the planetary gearset, and therefore IVT unit output shaft speed Nout is represented by the following expression (29), whereas axle driveshaft speed Nf is represented by the following expression (30).

$$Nout = -\{(1+\alpha)/(\alpha \cdot R13) - 1/(\alpha \cdot V \cdot R1)\} \cdot Nin \tag{29}$$

$$Nf = \{(1+\alpha)/(\alpha \cdot R13) - 1/(\alpha \cdot V \cdot R1)\} \cdot Nin/Rf \tag{30}$$

where Nin denotes the IVT unit input shaft speed, V denotes the CVT transmission ratio, R1 denotes the reduction ratio of reduction gear unit 40, R13 denotes the reduction ratio of torque split mode reduction gear unit 13, α denotes the reduction ratio of planetary gearset 105, and Rf denotes the final gear ratio of final gear 12.

Therefore, as can be seen from the torque split mode V-(1/Rivt) characteristic curve indicated by the uppermost solid line in FIG. 5, when downshifting the CVT transmission ratio V from the speed-increasing side (the highest speed-change ratio of the CVT) to the speed-decreasing side (the lowest speed-change ratio of the CVT) in the torque split mode, unit overall transmission ratio Rivt can be smoothly changed from the highest gear ratio of the CVT direct mode to a higher gear ratio exceeding the CVT-direct-mode highest gear ratio (second revolution synchronous point Q between the CVT direct mode and the torque split mode).

At the first revolution synchronous point P between the power recirculation mode and the CVT direct mode, a unit transmission ratio Nin/Nout for the CVT direct mode is represented by the following expression (31), whereas a unit transmission ratio Nin/Nout for the power recirculation mode is represented by the following expression (32).

$$Nin/Nout = -VLow \cdot R1 \tag{31}$$

$$Nin/Nout = -1/\{(1+\alpha)/(\alpha \cdot R3) - 1/(\alpha \cdot VLow \cdot R1)\} \tag{32}$$

At the first revolution synchronous point P, the right side (i.e., $-VLow \cdot R1$) of the expression (31) is equal to the right side (i.e., $-1/\{(1+\alpha)/(\alpha \cdot R3) - 1/(\alpha \cdot VLow \cdot R1)\}$) of the expression (32). Thus, the following equation (33) is satisfied.

$$-VLow \cdot R1 = -1/\{(1+\alpha)/(\alpha \cdot R3) - 1/(\alpha \cdot VLow \cdot R1)\} \tag{33}$$

$$(VLow \cdot R1) \cdot \{(1+\alpha)/(\alpha \cdot R3) - 1/(\alpha \cdot VLow \cdot R1)\} = 1$$

$$(VLow \cdot R1)(1+\alpha)/(\alpha \cdot R3) = 1 + 1/\alpha = (1+\alpha)/\alpha$$

$$\therefore VLow = R3/R1$$

At the second revolution synchronous point Q between the CVT direct mode and the torque split mode, a unit transmission ratio Nin/Nout for the CVT direct mode is represented by the following expression (34), whereas a unit transmission ratio Nin/Nout for the torque split mode is represented by the following expression (35).

$$Nin/Nout = -VHigh \cdot R1 \tag{34}$$

$$Nin/Nout = -1/\{(1+\alpha)/(\alpha \cdot R13) - 1/(\alpha \cdot VHigh \cdot R1)\} \tag{35}$$

At the second revolution synchronous point Q, the right side (i.e., $-VHigh \cdot R1$) of the expression (34) is equal to the right side (i.e., $-1/\{(1+\alpha)/(\alpha \cdot R13) - 1/(\alpha \cdot VHigh \cdot R1)\}$) of the expression (35). Thus, the following equation (36) is satisfied.

$$-VHigh \cdot R1 = -1/\{(1+\alpha)/(\alpha \cdot R13) - 1/(\alpha \cdot VHigh \cdot R1)\} \tag{36}$$

$$(VHigh \cdot R1) \cdot \{(1+\alpha)/(\alpha \cdot R13) - 1/(\alpha \cdot VHigh \cdot R1)\} = 1$$

$$(VHigh \cdot R1)(1+\alpha)/(\alpha \cdot R13) = 1 + 1/\alpha = (1+\alpha)/\alpha$$

$$\therefore VHigh = R13/R1$$

The following expression (37) is satisfied based on both the expressions (33) and (36).

$$VLow/VHigh = R3/R13 \tag{37}$$

As can be appreciated from the expression (37), in the same manner as the first embodiment, in the torque split IVT of the second embodiment shown in FIGS. 4–5, it is possible to match the unit transmission ratio Nin/Nout of the CVT direct mode to the unit transmission ratio Nin/Nout of the power recirculation mode at the lowest speed-change ratio VLow by optimally setting reduction ratio R3 of power recirculation mode reduction gear unit 3, and reduction ratio R13 of torque split mode reduction gear unit 13, so that the ratio R3/R13 of reduction ratio R3 of power recirculation mode reduction gear unit 3 to reduction ratio R13 of torque split mode reduction gear unit 13 is identical to the ratio VLow/VHigh of the lowest speed-change ratio VLow to the highest speed-change ratio VHigh. Likewise, by way of the same optimal ratio setting defined by VLow/VHigh=R3/R13, it is possible to match the unit transmission ratio Nin/Nout of the CVT direct mode to the unit transmission ratio Nin/Nout of the torque split mode at the highest speed-change ratio VHigh. In other words, the previously-noted optimal ratio setting defined by VLow/VHigh=R3/R13, ensures smooth switching between the power recirculation mode and the CVT direct mode with no difference of unit transmission ratio Nin/Nout, and ensures smooth switching between the CVT direct mode and the torque split mode with no difference of unit transmission ratio Nin/Nout. That is, according to the torque split IVT of the second embodiment shown in FIGS. 4–5, it is possible to remarkably effectively increase or widen the width of unit overall transmission ratio Rivt of the torque split IVT, while making best use of a CVT transmission ratio range from the lowest CVT speed-change ratio VLow to the highest CVT speed-change ratio VHigh at each of the power recirculation mode, the CVT direct mode, and the torque split mode.

Figure 6:
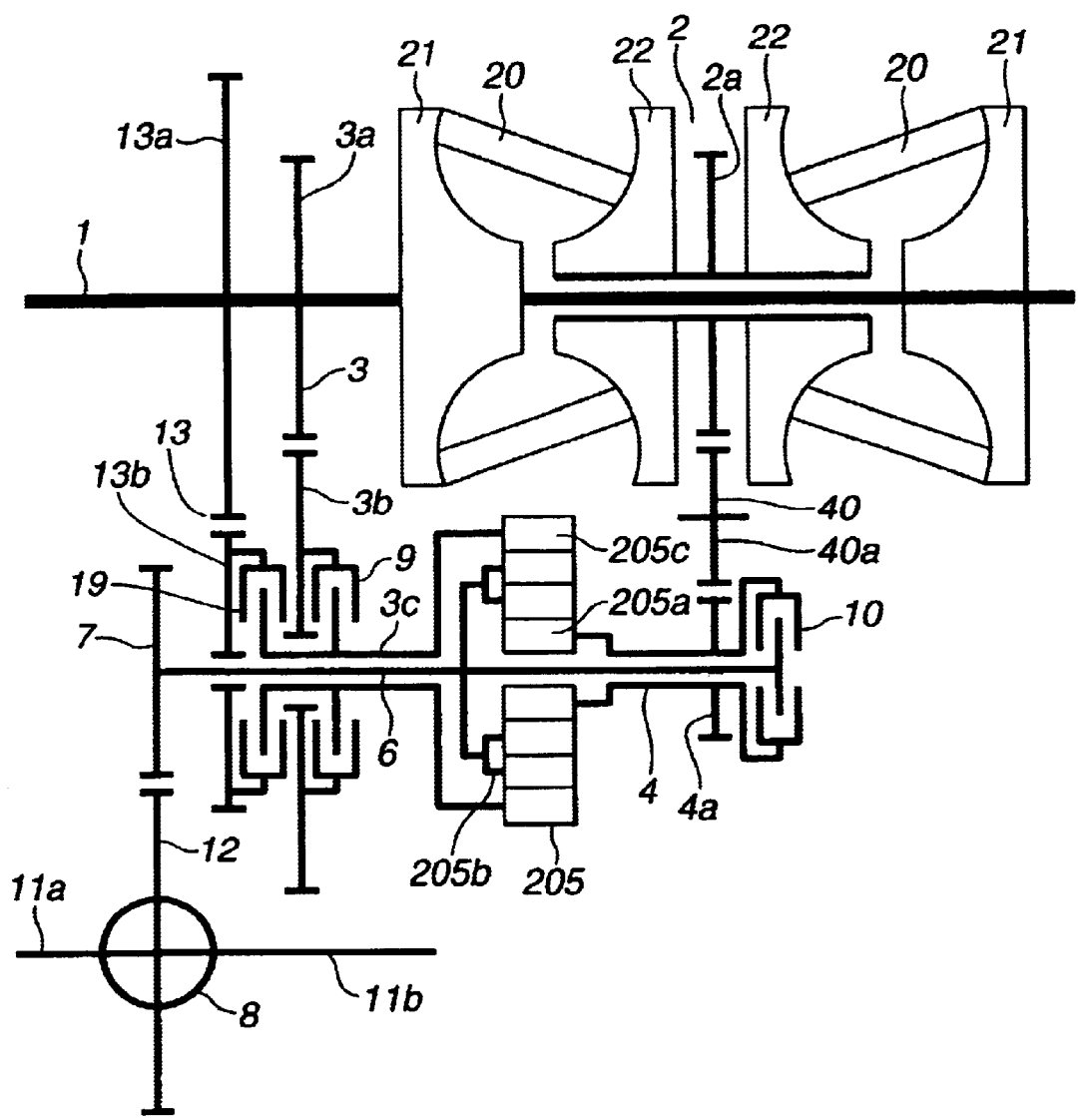
FIG. 6 is a skeleton diagram showing a torque split infinitely variable transmission (IVT) of a third embodiment.

Referring now to FIG. 6, there is shown the torque split infinitely variable transmission (IVT) of the third embodiment. The torque split IVTs of the first (see FIG. 1) and second (see FIG. 4) embodiments described previously are exemplified in a single-planet-pinion carrier equipped planetary gearset (5; 105), whereas the torque split IVT of the third embodiment (see FIG. 6) is exemplified in a double-planet-pinion carrier equipped planetary gearset (205). In the torque split IVT of the third embodiment, input rotation transmitted from IVT unit input shaft 1 to power recirculation mode reduction gear unit 3 or torque split mode reduction gear unit 13 is transferred to a ring gear 205c, and input rotation transmitted from IVT unit input shaft 1 to CVT 2 is transferred to sun gear 205a, and output rotation is transferred from double-planet-pinion carrier 205b to IVT unit output shaft 6. That is, sun gear 205a is coupled to CVT output shaft 4, whereas ring gear 205c is coupled to output shaft 3c common to power recirculation mode reduction gear unit 3 and torque split mode reduction gear unit 13. Double-planet-pinion carrier 205b is coupled to IVT unit output shaft 6. In the third embodiment, gear 4a is coaxially arranged with sun gear 205a of planetary gearset 205, while the first and second output gears 3b and 13b are coaxially arranged with ring gear 205c of planetary gearset 205.

With the previously-discussed arrangement, the torque split IVT of the third embodiment shown in FIG. 6 is operable at a selected one of three different operating modes, namely a power recirculation mode, a CVT direct mode, and a torque split mode. Actually, in the torque split IVT of the third embodiment, the driving torque input into IVT unit input shaft 1 is parallelly transmitted to each of CVT 2, power recirculation mode reduction gear unit 3, and torque split mode reduction gear unit 13. The driving torque input into CVT 2 is transmitted via counter gear 40a in meshed-engagement with CVT output gear 2a to gear 4a coaxially arranged with sun gear 205a. On the other hand, the driving torque input into each of power recirculation mode reduction gear unit 3 and torque split mode reduction gear unit 13 is transmitted via first and second input gears 3a and 13a to first and second output gears 3b and 13b coaxially arranged with ring gear 205c. Ring gear 205c of planetary gearset 105 is properly driven depending upon engaging and disengaging states of power recirculation mode clutch 9 and torque split mode clutch 19. In the third embodiment, owing to the use of counter gear 40a and the toroidal type of CVT 2, the direction of rotation of sun gear 205a is in the same sense relative to that of ring gear 205c and reversed relative to that of IVT unit input shaft 1. In the power recirculation mode position in which power recirculation mode clutch 9 is engaged and torque split mode clutch 19 and direct mode clutch 10 are both disengaged, input rotation, reversed by power recirculation mode reduction gear 3 and thus having a direction opposite to the rotation direction of IVT unit input shaft 1, is transferred to ring gear 205c. Thus, ring gear speed Nr is represented by the following expression (38).

$$Nr=-Nin/R3 \qquad (38)$$

where Nin denotes the IVT unit input shaft speed, and R3 denotes a reduction ratio of power recirculation mode reduction gear unit 3.

In the power recirculation mode position, the direction of rotation of sun gear 205a that is coupled to CVT output shaft 4 is also in the opposite sense relative to that of IVT unit input shaft 1, since CVT 2 is the toroidal CVT and the input rotation transmitted to CVT output gear 2a is transferred via counter gear 40a to CVT output shaft 4. Thus, a revolution speed (a speed Ns) of sun gear 5a is represented by the following expression (39).

$$Ns=-Nin/(V \cdot R1) \qquad (39)$$

where Nin denotes the IVT unit input shaft speed, V denotes the CVT transmission ratio of CVT 2, and R1 denotes the reduction ratio of reduction gear unit 40.

IVT unit output shaft 6 is coupled to double-planet-pinion carrier 205b of planetary gearset 205, and therefore a revolution speed (a speed Nout) of IVT unit output shaft 6 is represented by the following expression (40), whereas a revolution speed (an axle driveshaft speed Nf) is represented by the following expression (41).

$$Nout=-1/(1-\alpha)\cdot\{1/R3-\alpha/(V \cdot R1)\}\cdot Nin \qquad (40)$$

$$Nf=1/(1-\alpha)\cdot\{1/R3-\alpha/(V \cdot R1)\}\cdot Nin/Rf \qquad (41)$$

where Nin denotes the IVT unit input shaft speed, V denotes the CVT transmission ratio, R1 denotes the reduction ratio of reduction gear unit 40, R3 denotes the reduction ratio of power recirculation mode reduction gear unit 3, α denotes the reduction ratio of planetary gearset 205 (i.e., a ratio of the number of teeth of sun gear 205a to the number of teeth of ring gear 205c), and Rf denotes the final gear ratio of final gear 12.

Figure 7:
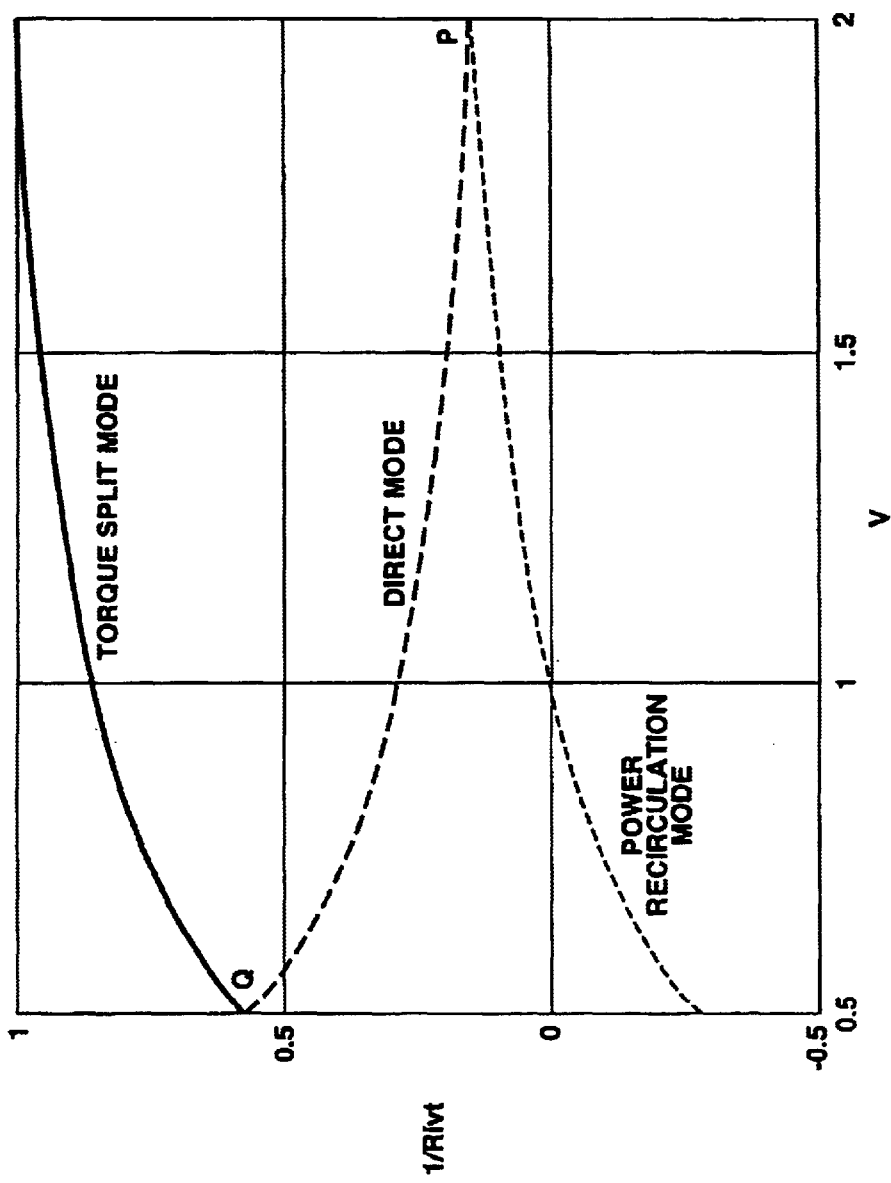
FIG. 7 shows characteristic curves of an inverse 1/Rivt of an IVT unit transmission ratio (a unit overall transmission ratio Rivt) based on both a CVT transmission ratio V and a final gear ratio, at each of three different operating modes, namely a torque split mode, a CVT direct mode, and a power recirculation mode, obtained in the torque split IVT of the third embodiment.

Therefore, as can be seen from the power recirculation mode V-(1/Rivt) characteristic curve indicated by the lowermost broken line in FIG. 7, when downshifting the CVT transmission ratio V from the speed-increasing side (the highest speed-change ratio of the CVT) to the speed-decreasing side (the lowest speed-change ratio of the CVT) in the power recirculation mode, unit overall transmission ratio Rivt can be smoothly changed from a reverse-rotation gear ratio (a negative gear ratio, i.e., Rivt<0) via a geared neutral point GNP (at which the output speed of the torque split IVT is zero and thus the vehicle is in a stopped state, in other words, Rivt=∞) to a normal-rotation gear ratio (a positive gear ratio, i.e., Rivt>0). During shifting from the speed-increasing side to the speed-decreasing side in the power recirculation mode position, shifting can be made until unit overall transmission ratio Rivt reaches a first mode revolution synchronous point P. FIG. 7 shows an example of each mode characteristic curve obtained under a particular condition wherein CVT transmission ratio V, and reduction ratios R1, R3, Rf, and α of the reduction gearsets are set in the same set values as the first embodiment shown in FIGS. 1–3 (or the second embodiment shown in FIGS. 4–5).

In contrast, in CVT direct mode position in which power recirculation mode clutch 9 and torque split mode clutch 19 are disengaged and direct mode clutch 10 is engaged, each of power recirculation mode reduction gear unit 3, torque split mode reduction gear unit 13, and planetary gearset 205 is disengaged or uncoupled from the power-transmission line. Thus, IVT unit output shaft speed Nout is represented by the following expression (42), while axle driveshaft speed Nf is represented by the following expression (43).

$$Nout=-Nin/(V \cdot R1) \quad (42)$$

$$Nf=Nin/(V \cdot R1 \cdot Rf) \quad (43)$$

That is, as can be seen from the direct mode V-(1/Rivt) characteristic curve indicated by the intermediate broken line in FIG. 7, when upshifting the CVT transmission ratio V from the speed-decreasing side (the lowest speed-change ratio VLow) to the speed-increasing side (the highest speed-change ratio VHigh) in the CVT direct mode under a particular condition of Nin=1, axle driveshaft speed Nf can be continuously changed within a range between a value $1/(VLow \cdot R1 \cdot Rf)$ corresponding to the lowest speed-change ratio VLow and a value $1/(VHigh \cdot R1 \cdot Rf)$ corresponding to the highest speed-change ratio VHigh.

In the torque split mode position in which torque split mode clutch 19 is engaged and power recirculation mode clutch 9 and direct mode clutch 10 are both disengaged, input rotation, reversed by torque split mode reduction gear 13 and thus having a direction opposite to the rotation direction of IVT unit input shaft 1, is transferred to ring gear 205c. Thus, ring gear speed Nr is represented by the following expression (44).

$$Nr=-Nin/R13 \quad (44)$$

where Nin denotes the IVT unit input shaft speed, and R13 denotes a reduction ratio of torque split mode reduction gear unit 13.

In the torque split mode position, the direction of rotation of sun gear 205a that is coupled to CVT output shaft 4 is in the opposite sense relative to that of IVT unit input shaft 1, since CVT 2 is the toroidal CVT and the input rotation transmitted to CVT output gear 2a is transferred via counter gear 40a to CVT output shaft 4. Thus, sun gear speed Ns is represented by the following expression (45).

$$Ns=-Nin/(V \cdot R1) \quad (45)$$

where Nin denotes the IVT unit input shaft speed, V denotes the CVT transmission ratio of CVT 2, and R1 denotes the reduction ratio of reduction gear unit 40.

IVT unit output shaft 6 is coupled to double-planet-pinion carrier 205b of the planetary gearset, and therefore IVT unit output shaft speed Nout is represented by the following expression (46), whereas axle driveshaft speed Nf is represented by the following expression (47).

$$Nout=-1/(1-\alpha) \cdot \{1/R13-\alpha/(V \cdot R1)\} \cdot Nin \quad (46)$$

$$Nf=1/(1-\alpha) \cdot \{1/R13-\alpha/(V \cdot R1)\} \cdot Nin/Rf \quad (47)$$

where Nin denotes the IVT unit input shaft speed, V denotes the CVT transmission ratio, R1 denotes the reduction ratio of reduction gear unit 40, R13 denotes the reduction ratio of torque split mode reduction gear unit 13, α denotes the reduction ratio of planetary gearset 205, and Rf denotes the final gear ratio of final gear 12.

Therefore, as can be seen from the torque split mode V-(1/Rivt) characteristic curve indicated by the uppermost solid line in FIG. 7, when downshifting the CVT transmission ratio V from the speed-increasing side (the highest speed-change ratio VHigh of the CVT) to the speed-decreasing side (the lowest speed-change ratio VLow of the CVT) in the torque split mode, unit overall transmission ratio Rivt can be smoothly changed from the highest gear ratio of the CVT direct mode to a higher gear ratio exceeding the CVT-direct-mode highest gear ratio (second revolution synchronous point Q between the CVT direct mode and the torque split mode).

At the first revolution synchronous point P between the power recirculation mode and the CVT direct mode, a unit transmission ratio Nin/Nout for the CVT direct mode is represented by the following expression (48), whereas a unit transmission ratio Nin/Nout for the power recirculation mode is represented by the following expression (49).

$$Nin/Nout=-VLow \cdot R1 \quad (48)$$

$$Nin/Nout=-(1-\alpha) \cdot VLow \cdot R$$

$$1 \cdot R3/\{VLow \cdot R1-\alpha \cdot R3\} \quad (49)$$

At the first revolution synchronous point P, the right side (i.e., $-VLow \cdot R1$) of the expression (48) is equal to the right side (i.e., $-(1-\alpha)-VLow \cdot R1 \cdot R3/\{VLow \cdot R1 \cdot \alpha \cdot R3\}$) of the expression (49). Thus, the following equation (50) is satisfied.

$$-VLow \cdot R1 = -(1-\alpha) \cdot VLow \cdot R1 \cdot R3/\{VLow \cdot R1 - \alpha \cdot R3\} \quad (50)$$

$$VLow \cdot R1 \cdot (VLow \cdot R1 - \alpha \cdot R3) = (1-\alpha) \cdot VLow \cdot R1 \cdot R3$$

$$VLow \cdot R1 - \alpha \cdot R3 = (1-\alpha) \cdot R3$$

$$\therefore VLow = R3/R1$$

At the second revolution synchronous point Q between the CVT direct mode and the torque split mode, a unit transmission ratio Nin/Nout for the CVT direct mode is represented by the following expression (51), whereas a unit transmission ratio Nin/Nout for the torque split mode is represented by the following expression (52).

$$Nin/Nout=-VHigh \cdot R1 \quad (51)$$

$$Nin/Nout=-(1-\alpha) \cdot VHigh \cdot R1 \cdot R13/\{VHigh \cdot R1-\alpha \cdot R13\} \quad (52)$$

At the second revolution synchronous point Q, the right side (i.e., $-VHigh \cdot R1$) of the expression (51) is equal to the right side (i.e., $-(1-\alpha) \cdot VHigh \cdot R1 \cdot R13/\{VHigh \cdot R1 \cdot \alpha \cdot R13\}$) of the expression (52). Thus, the following equation (53) is satisfied.

$$-VHigh \cdot R1 = -(1-\alpha) \cdot VHigh \cdot R1 \cdot R13/\{VHigh \cdot R1 - \alpha \cdot R13\} \quad (53)$$

$$VHigh \cdot R1 \cdot (VHigh \cdot R1 - \alpha \cdot R13) = (1-\alpha) \cdot VHigh \cdot R1 \cdot R13$$

$$VHigh \cdot R1 - \alpha \cdot R13 = (1-\alpha) \cdot R13$$

$$\therefore VHigh = R13/R1$$

The following expression (54) is satisfied based on both the expressions (50) and (53).

$$V_{Low}/V_{High} = R3/R13 \tag{54}$$

As can be appreciated from the expression (54), in the same manner as the first and second embodiments, in the torque split IVT of the third embodiment shown in FIGS. 6–7, it is possible to match the unit transmission ratio Nin/Nout of the CVT direct mode to the unit transmission ratio Nin/Nout of the power recirculation mode at the lowest speed-change ratio VLow by optimally setting reduction ratio R3 of power recirculation mode reduction gear unit 3, and reduction ratio R13 of torque split mode reduction gear unit 13, so that the ratio R3/R13 of reduction ratio R3 of power recirculation mode reduction gear unit 3 to reduction ratio R13 of torque split mode reduction gear unit 13 is identical to the ratio VLow/VHigh of the lowest speed-change ratio VLow to the highest speed-change ratio VHigh. Likewise, by way of the same optimal ratio setting defined by VLow/VHigh=R3/R13, it is possible to match the unit transmission ratio Nin/Nout of the CVT direct mode to the unit transmission ratio Nin/Nout of the torque split mode at the highest speed-change ratio VHigh. In other words, the previously-noted optimal ratio setting defined by VLow/VHigh=R3/R13, ensures smooth switching between the power recirculation mode and the CVT direct mode with no difference of unit transmission ratio Nin/Nout, and ensures smooth switching between the CVT direct mode and the torque split mode with no difference of unit transmission ratio Nin/Nout. That is, according to the torque split IVT of the third embodiment shown in FIGS. 6–7, it is possible to remarkably effectively increase or widen the width of unit overall transmission ratio Rivt of the torque split IVT, while making best use of a CVT transmission ratio range from the lowest CVT speed-change ratio VLow to the highest CVT speed-change ratio VHigh at each of the power recirculation mode, the CVT direct mode, and the torque split mode.

Figure 8:
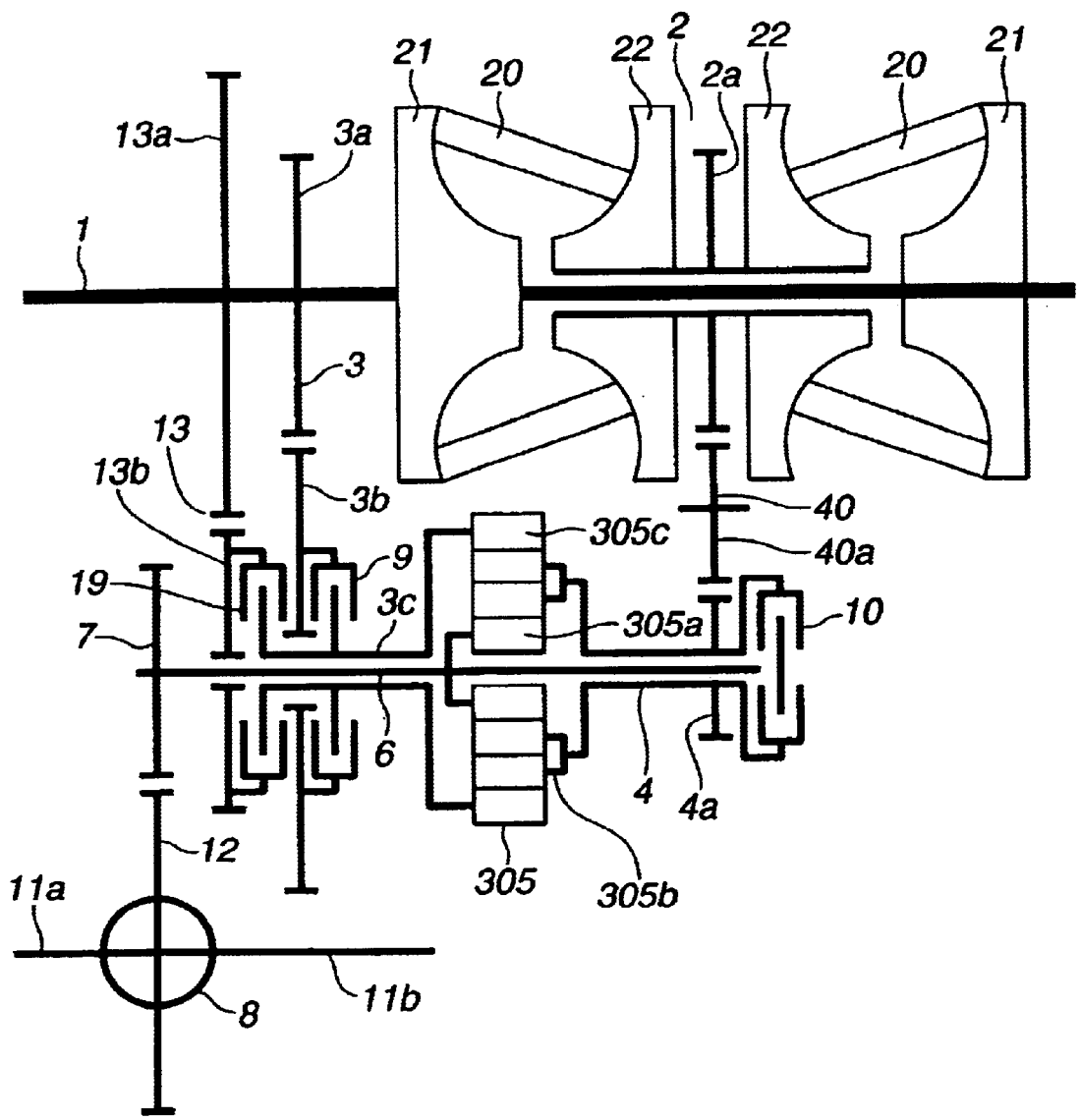
FIG. 8 is a skeleton diagram showing a torque split infinitely variable transmission (IVT) of a fourth embodiment.

Referring now to FIG. 8, there is shown the torque split infinitely variable transmission (IVT) of the fourth embodiment. In the same manner as the torque split IVT of the third (see FIG. 6) embodiment described previously, the torque split IVT of the fourth embodiment of FIG. 8 uses a double-planet-pinion carrier equipped planetary gearset 305. In the torque split IVT of the fourth embodiment, input rotation transmitted from IVT unit input shaft 1 to power recirculation mode reduction gear unit 3 or torque split mode reduction gear unit 13 is transferred to a ring gear 305c, and input rotation transmitted from IVT unit input shaft 1 to CVT 2 is transferred to double-planet-pinion carrier 305b, and output rotation is transferred from sun gear 305a to IVT unit output shaft 6. That is, double-planet-pinion carrier 305b is coupled to CVT output shaft 4, whereas ring gear 305c is coupled to output shaft 3c common to power recirculation mode reduction gear unit 3 and torque split mode reduction gear unit 13. Sun gear 305a is coupled to IVT unit output shaft 6. In the fourth embodiment, gear 4a is coaxially arranged with double-planet-pinion carrier 305b of planetary gearset 305, while the first and second output gears 3b and 13b are coaxially arranged with ring gear 305c of planetary gearset 305.

With the previously-discussed arrangement, the torque split IVT of the fourth embodiment shown in FIG. 8 is operable at a selected one of three different operating modes, namely a power recirculation mode, a CVT direct mode (simply, a direct mode), and a torque split mode. Actually, in the torque split IVT of the fourth embodiment, the driving torque input into IVT unit input shaft 1 is parallelly transmitted to each of CVT 2, power recirculation mode reduction gear unit 3, and torque split mode reduction gear unit 13. The driving torque input into CVT 2 is transmitted via counter gear 40a in meshed-engagement with CVT output gear 2a to gear 4a coaxially arranged with double-planet-pinion carrier 305b. On the other hand, the driving torque input into each of power recirculation mode reduction gear unit 3 and torque split mode reduction gear unit 13 is transmitted via first and second input gears 3a and 13a to first and second output gears 3b and 13b coaxially arranged with ring gear 305c. Ring gear 305c of planetary gearset 305 is properly driven depending upon engaging and disengaging states of power recirculation mode clutch 9 and torque split mode clutch 19. In the third embodiment, owing to the use of counter gear 40a and the toroidal type of CVT 2, the direction of rotation of carrier 305b is in the same sense relative to that of ring gear 305c and reversed relative to that of IVT unit input shaft 1. In the power recirculation mode position in which power recirculation mode clutch 9 is engaged and torque split mode clutch 19 and direct mode clutch 10 are both disengaged, input rotation, reversed by power recirculation mode reduction gear 3 and thus having a direction opposite to the rotation direction of IVT unit input shaft 1, is transferred to ring gear 305c. Thus, ring gear speed Nr is represented by the following expression (55).

$$Nr = -Nin/R3 \tag{55}$$

where Nin denotes the IVT unit input shaft speed, and R3 denotes a reduction ratio of power recirculation mode reduction gear unit 3.

In the power recirculation mode position, the direction of rotation of double-planet-pinion carrier 305b that is coupled to CVT output shaft 4 is also in the opposite sense relative to that of IVT unit input shaft 1, since CVT 2 is the toroidal CVT and the input rotation transmitted to CVT output gear 2a is transferred via counter gear 40a to CVT output shaft 4. Thus, a revolution speed (a speed Nc) of carrier 305b is represented by the following expression (56).

$$Nc = -Nin/(V \cdot R1) \tag{56}$$

where Nin denotes the IVT unit input shaft speed, V denotes the CVT transmission ratio of CVT 2, and R1 denotes the reduction ratio of reduction gear unit 40.

IVT unit output shaft 6 is coupled to sun gear 305a of planetary gearset 305, and therefore a revolution speed (a speed Nout) of IVT unit output shaft 6 is represented by the following expression (57).

$$\begin{aligned} Nout &= -\{1/R3 + (\alpha - 1)/(V \cdot R1)\}/\alpha \cdot Nin \\ &= -\{1/\alpha/R3 + (\alpha - 1)/\alpha/(V \cdot R1)\} \cdot Nin \end{aligned} \tag{57}$$

where Nin denotes the IVT unit input shaft speed, V denotes the CVT transmission ratio, R1 denotes the reduction ratio of reduction gear unit 40, R3 denotes the reduction ratio of power recirculation mode reduction gear unit 3, and α denotes the reduction ratio of planetary gearset 305 (i.e., a ratio of the number of teeth of sun gear 305a to the number of teeth of ring gear 305c).

Figure 9:
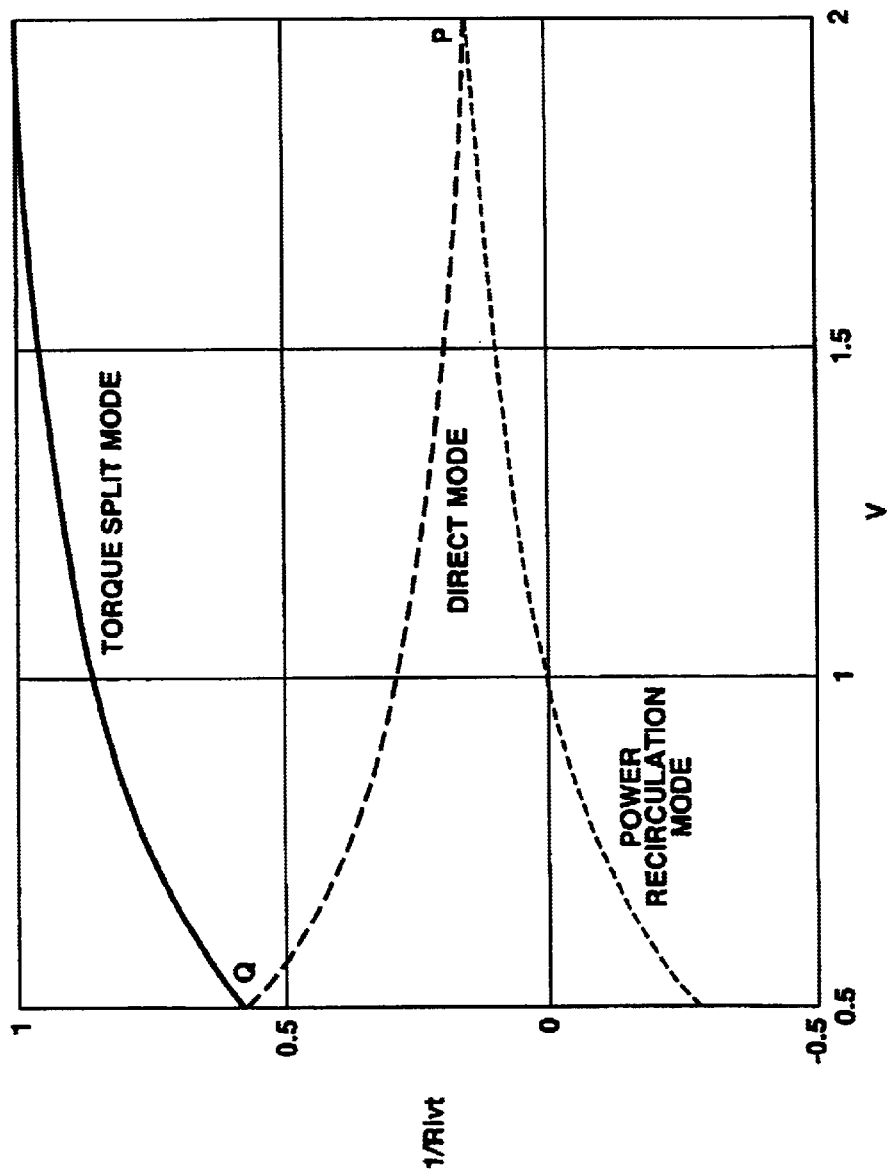
FIG. 9 shows characteristic curves of an inverse 1/Rivt of an IVT unit transmission ratio (a unit overall transmission ratio Rivt) based on both a CVT transmission ratio V and a final gear ratio, at each of three different operating modes, namely a torque split mode, a CVT direct mode, and a power recirculation mode, obtained in the torque split IVT of the fourth embodiment.

Therefore, as can be seen from the power recirculation mode V-(1/Rivt) characteristic curve indicated by the lowermost broken line in FIG. 9, when downshifting the CVT transmission ratio V from the speed-increasing side (the highest speed-change ratio of the CVT) to the speed-decreasing side (the lowest speed-change ratio of the CVT) in the power recirculation mode, unit overall transmission ratio Rivt can be smoothly changed from a reverse-rotation gear ratio (a negative gear ratio, i.e., Rivt<0) via a geared neutral point GNP (at which the output speed of the torque split IVT is zero and thus the vehicle is in a stopped state, in other words, Rivt=∞) to a normal-rotation gear ratio (a positive gear ratio, i.e., Rivt>0). During shifting from the speed-increasing side to the speed-decreasing side in the power recirculation mode position, shifting can be made until unit overall transmission ratio Rivt reaches a first revolution synchronous point P. FIG. 9 shows an example of each mode characteristic curve obtained under a particular condition wherein CVT transmission ratio V, and reduction ratios R1, R3, Rf, and α of the reduction gearsets are set in the same set values as the first embodiment shown in FIGS. 1–3 (or the second embodiment shown in FIGS. 4–5 or the third embodiment shown in FIGS. 6–7).

In contrast, in CVT direct mode position in which power recirculation mode clutch 9 and torque split mode clutch 19 are disengaged and direct mode clutch 10 is engaged, each of power recirculation mode reduction gear unit 3, torque split mode reduction gear unit 13, and planetary gearset 305 is disengaged or uncoupled from the power-transmission line. Thus, IVT unit output shaft speed Nout is represented by the following expression (58).

$$Nout=-Nin/(V \cdot R1) \qquad (58)$$

That is, as can be seen from the direct mode V-(1/Rivt) characteristic curve indicated by the intermediate broken line in FIG. 9, when upshifting the CVT transmission ratio V from the speed-decreasing side (the lowest speed-change ratio VLow) to the speed-increasing side (the highest speed-change ratio VHigh) in the CVT direct mode under a particular condition of Nin=1, IVT unit output shaft speed Nout can be continuously changed within a range between a value 1/(VLow·R1) corresponding to the lowest speed-change ratio VLow and a value 1/(VHigh·R1) corresponding to the highest speed-change ratio VHigh.

In the torque split mode position in which torque split mode clutch 19 is engaged and power recirculation mode clutch 9 and direct mode clutch 10 are both disengaged, input rotation, reversed by torque split mode reduction gear 13 and thus having a direction opposite to the rotation direction of IVT unit input shaft 1, is transferred to ring gear 305c. Thus, ring gear speed Nr is represented by the following expression (59).

$$Nr=-Nin/R13 \qquad (59)$$

where Nin denotes the IVT unit input shaft speed, and R13 denotes a reduction ratio of torque split mode reduction gear unit 13.

In the torque split mode position, the direction of rotation of double-planet-pinion carrier 305b that is coupled to CVT output shaft 4 is in the opposite sense relative to that of IVT unit input shaft 1, since CVT 2 is the toroidal CVT and the input rotation transmitted to CVT output gear 2a is transferred via counter gear 40a to CVT output shaft 4. Thus, carrier speed Nc is represented by the following expression (60).

$$Nc=-Nin/(V \cdot R1) \qquad (60)$$

where Nin denotes the IVT unit input shaft speed, V denotes the CVT transmission ratio of CVT 2, and R1 denotes the reduction ratio of reduction gear unit 40.

IVT unit output shaft 6 is coupled to sun gear 305a of the planetary gearset, and therefore IVT unit output shaft speed Nout is represented by the following expression (61).

$$Nout=-\{1/\alpha/R13+(\alpha-1)/\alpha/(V \cdot R1)\} \cdot Nin \qquad (61)$$

where Nin denotes the IVT unit input shaft speed, V denotes the CVT transmission ratio, R1 denotes the reduction ratio of reduction gear unit 40, R13 denotes the reduction ratio of torque split mode reduction gear unit 13, and α denotes the reduction ratio of planetary gearset 305.

Therefore, as can be seen from the torque split mode V-(1/Rivt) characteristic curve indicated by the uppermost solid line in FIG. 9, when downshifting the CVT transmission ratio V from the speed-increasing side (the highest speed-change ratio of the CVT) to the speed-decreasing side (the lowest speed-change ratio of the CVT) in the torque split mode, unit overall transmission ratio Rivt can be smoothly changed from the highest gear ratio of the CVT direct mode to a higher gear ratio exceeding the CVT-direct-mode highest gear ratio (second revolution synchronous point Q between the CVT direct mode and the torque split mode).

At the first revolution synchronous point P between the power recirculation mode and the CVT direct mode, a unit transmission ratio Nin/Nout for the CVT direct mode is represented by the following expression (62), whereas a unit transmission ratio Nin/Nout for the power recirculation mode is represented by the following expression (63).

$$Nin/Nout=-VLow \cdot R1 \qquad (62)$$

$$Nin/Nout=-1/\{1/\alpha/R3+(\alpha-1)/\alpha/(VLow \cdot R1)\} \qquad (63)$$

At the first revolution synchronous point P, the right side (i.e., −VLow·R1) of the expression (62) is equal to the right side (i.e., −1/{1/α/R3+(α−1)/α/(VLow·R1)}) of the expression (63). Thus, the following equation (64) is satisfied.

$$-VLow \cdot R1 = -1/\{1/\alpha/R3 + (\alpha-1)/\alpha/(VLow \cdot R1)\} \qquad (64)$$

$$-VLow \cdot R1 = -(\alpha \cdot VLow \cdot R1 \cdot R3)/\{VLow \cdot R1 + (\alpha-1) \cdot R3\}$$

$$VLow \cdot R1 \cdot \{VLow \cdot R1 + (\alpha-1) \cdot R3\} = \alpha \cdot VLow \cdot R1 \cdot R3$$

$$VLow \cdot R1 + (\alpha-1) \cdot R3 = \alpha \cdot R3$$

$$\therefore VLow = R3/R1$$

At the second revolution synchronous point Q between the CVT direct mode and the torque split mode, a unit transmission ratio Nin/Nout for the CVT direct mode is represented by the following expression (65), whereas a unit transmission ratio Nin/Nout for the torque split mode is represented by the following expression (66).

$$Nin/Nout=-VHigh \cdot R1 \qquad (65)$$

$$Nin/Nout=-1/\{1/\alpha/R13+(\alpha-1)/\alpha/(VHigh \cdot R1)\} \qquad (66)$$

At the second revolution synchronous point Q, the right side (i.e., −VHigh·R1) of the expression (65) is equal to the right side (i.e., −1/{1/α/R13+(α−1)/α/(VHigh·R1)}) of the expression (66). Thus, the following equation (67) is satisfied.

$$-VHigh \cdot R1 = -1/\{1/\alpha/R13 + (\alpha-1)/\alpha/(VHigh \cdot R1)\} \qquad (67)$$

$$-VHigh \cdot R1 = -(\alpha \cdot VHigh \cdot R1 \cdot R13)/\{VHigh \cdot R1 + (\alpha-1) \cdot R13\}$$

$$VHigh \cdot R1 \cdot \{VHigh \cdot R1 + (\alpha-1) \cdot R13\} = \alpha \cdot VHigh \cdot R1 \cdot R13$$

$$VHigh \cdot R1 + (\alpha-1) \cdot R13 = \alpha \cdot R13$$

$$\therefore VHigh = R13/R1$$

The following expression (68) is satisfied based on both the expressions (64) and (67).

$$VLow/VHigh=R3/R13 \qquad (68)$$

As can be appreciated from the expression (68), in the same manner as the first, second, and third embodiments, in the torque split IVT of the fourth embodiment shown in FIGS. 8–9, it is possible to match the unit transmission ratio Nin/Nout of the CVT direct mode to the unit transmission ratio Nin/Nout of the power recirculation mode at the lowest speed-change ratio VLow by optimally setting reduction ratio R3 of power recirculation mode reduction gear unit 3, and reduction ratio R13 of torque split mode reduction gear unit 13, so that the ratio R3/R13 of reduction ratio R3 of power recirculation mode reduction gear unit 3 to reduction ratio R13 of torque split mode reduction gear unit 13 is identical to the ratio VLow/VHigh of the lowest speed-change ratio VLow to the highest speed-change ratio VHigh. Likewise, by way of the same optimal ratio setting defined by VLow/VHigh=R3/R13, it is possible to match the unit transmission ratio Nin/Nout of the CVT direct mode to the unit transmission ratio Nin/Nout of the torque split mode at the highest speed-change ratio VHigh. In other words, the previously-noted optimal ratio setting defined by VLow/VHigh=R3/R13, ensures smooth switching between the power recirculation mode and the CVT direct mode with no difference of unit transmission ratio Nin/Nout, and ensures smooth switching between the CVT direct mode and the torque split mode with no difference of unit transmission ratio Nin/Nout. That is, according to the torque split IVT of the fourth embodiment shown in FIGS. 8–9, it is possible to remarkably effectively increase or widen the width of unit overall transmission ratio Rivt of the torque split IVT, while making best use of a CVT transmission ratio range from the lowest CVT speed-change ratio VLow to the highest CVT speed-change ratio VHigh at each of the power recirculation mode, the CVT direct mode, and the torque split mode.

As will be appreciated from the above, in the torque split infinitely variable transmission of each of the first (see FIGS. 1–3), second (see FIGS. 4–5), third (see FIGS. 6–7), and fourth (see FIGS. 8–9) embodiments, it is possible to realize either of three different operating modes, namely a power recirculation mode, a CVT direct mode, and a torque split mode by selectively engaging and disengaging power recirculation mode clutch 9, direct mode clutch 10, and torque split mode clutch 19. As compared to a conventional infinitely variable transmission that merely uses two different operating modes, namely a CVT direct mode and a power recirculation mode, the torque split infinitely variable transmission of each of the shown embodiments enables a remarkable enlargement in a shifting range (see the torque split mode V-(1/Rivt) characteristic curve located above the direct mode V-(1/Rivt) characteristic curve (see FIGS. 2, 5, 7 and 9). In particular, it is possible to effectively reduce engine speeds during high-speed driving of the vehicle. This largely improves fuel economy. Additionally, in the torque split mode position, it is possible to relatively reduce the power passing through the CVT in comparison with the CVT direct mode. Thus, in the torque split mode position, it is possible to relatively enhance the total transmission efficiency of the power train (power transmission line) between IVT unit input shaft 1 and IVT unit output shaft 6. This contributes to reduced fuel consumption.

According to the torque split infinitely variable transmission of the second embodiment of FIGS. 4 and 5 in which the input (105b, 105c) and output (105a) elements of planetary gearset 105 of the second embodiment are modified from the input (5a, 5b) and output (5c) elements of planetary gearset 5 of the first embodiment, it is possible to provide the same effects as the first embodiment, that is, the remarkable enlargement in the shifting range, reduced fuel consumption, and enhanced transmission efficiency. In the torque split IVT of the first embodiment (see FIG. 2) the inverse 1/Rivt of unit overall transmission ratio Rivt ranges from approximately −0.06 to approximately −0.79, whereas in the torque split IVT of the second embodiment (see FIG. 5) the inverse 1/Rivt of unit overall transmission ratio Rivt ranges from approximately −0.70 to approximately 1.42. That is to say, in comparison with the first embodiment, the torque split IVT of the second embodiment enables a relatively wider range of unit overall transmission ratio Rivt, thus more effectively improving fuel economy. That is, the torque split IVT of the second embodiment can be efficiently operated within a limited or pre-selected operating range having a relatively high CVT efficiency, for the same range of unit overall transmission ratio Rivt as the first embodiment. This contributes to improved fuel economy and down-sizing, light weight and reduced cost of the torque split IVT.

According to the torque split infinitely variable transmission of the third embodiment of FIGS. 6 and 7 in which a double-planet-pinion carrier equipped planetary gearset 205 is used instead of a single-planet-pinion carrier equipped planetary gearset (5; 105), and additionally the input (205a, 205c) and output (205b) elements of planetary gearset 205 of the third embodiment are modified from the input (105b, 105c) and output (105a) elements of planetary gearset 105 of the second embodiment shown in FIGS. 4 and 5, it is possible to provide the same effects as the second embodiment. The torque (that is, an increased torque relative to the torque through IVT unit input shaft 1) through power recirculation mode reduction gear unit 3 during the power recirculation mode is transmitted to ring gear 205c having a comparatively large outside diameter (i.e., a comparatively large torque capacity). This is advantageous with respect to increase in mechanical strength, enhanced durability of the planetary gearset, and down-sizing of the torque split IVT unit.

According to the torque split infinitely variable transmission of the fourth embodiment of FIGS. 8 and 9 in which the input (305b, 305c) and output (305a) elements of double-planet-pinion carrier equipped planetary gearset 305 of the fourth embodiment are modified from the input (205a, 205c) and output (205b) elements of planetary gearset 205 of the third embodiment shown in FIGS. 6 and 7, it is possible to provide the same effects as the third embodiment. In the same manner as the third embodiment, in the torque split IVT of the fourth embodiment, the torque (that is, an increased torque relative to the torque through IVT unit input shaft 1) through power recirculation mode reduction gear unit 3 during the power recirculation mode is transmitted to ring gear 305c having a comparatively large outside diameter (i.e., a comparatively large torque capacity). This is advantageous with respect to increase in mechanical strength, enhanced durability of the planetary gearset, and down-sizing of the torque split IVT unit. In addition to the above, in the torque split mode position, it is possible to relatively reduce the power passing through the CVT in comparison with the CVT direct mode. Thus, in the torque split mode position, it is possible to relatively enhance the total transmission efficiency of the power train (power transmission line) between IVT unit input shaft 1 and IVT unit output shaft 6. This contributes to reduced fuel consumption.

Furthermore, according to the shown embodiments, it is possible to match the unit transmission ratio Nin/Nout of the CVT direct mode to the unit transmission ratio Nin/Nout of the power recirculation mode at the lowest speed-change ratio VLow (in other words, the CVT maximum transmission ratio) by optimally setting reduction ratio R3 of power recirculation mode reduction gear unit 3, and reduction ratio R13 of torque split mode reduction gear unit 13, so that the ratio R3/R13 of reduction ratio R3 of power recirculation mode reduction gear unit 3 to reduction ratio R13 of torque split mode reduction gear unit 13 is identical to the ratio VLow/VHigh of the lowest speed-change ratio VLow to the highest speed-change ratio VHigh. By way of the same optimal ratio setting defined by VLow/VHigh=R3/R13, it is possible to match the unit transmission ratio Nin/Nout of the CVT direct mode to the unit transmission ratio Nin/Nout of the torque split mode at the highest speed-change ratio VHigh (in other words, the CVT minimum transmission ratio). The optimal ratio setting defined by VLow/VHigh= R3/R13, ensures smooth switching between the power recirculation mode and the CVT direct mode with no difference of unit transmission ratio Nin/Nout, and ensures smooth switching between the CVT direct mode and the torque split mode with no difference of unit transmission ratio Nin/Nout. As set forth above, it is possible to remarkably effectively increase or widen the width of unit overall transmission ratio Rivt of the torque split IVT, while making best use of a CVT transmission ratio range from the lowest CVT speed-change ratio VLow to the highest CVT speed-change ratio VHigh at each of the power recirculation mode, the CVT direct mode, and the torque split mode.

Moreover, in the shown embodiments, CVT 2 is constructed by a toroidal CVT in which the direction of rotation of CVT output disk 22 is in the opposite sense relative to that of CVT input disk 21. Thus, it is unnecessary to reverse the input rotation reversed by power recirculation mode reduction gear 3 or torque split mode reduction gear 13 by means of an additional counter gear. That is, the use of the toroidal CVT eliminates the necessity of the additional counter gear that converts the direction of input rotation into an opposite sense. This contributes to down-sizing of the torque split IVT unit.

The entire contents of Japanese Patent Application No. P2001-296507 (filed Sep. 27, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A torque split infinitely variable transmission comprising:
    a continuously variable transmission connected to a unit input shaft of the infinitely variable transmission;
    a power recirculation mode reduction gear unit connected to the unit input shaft;
    a torque split mode reduction gear unit connected to the unit input shaft;
    a planetary gearset comprising:
        a first member coupled to an output shaft of the continuously variable transmission;
        a second member coupled to a common output shaft common to the power recirculation mode reduction gear unit and the torque split mode reduction gear unit; and
        a third member coupled to a unit output shaft of the infinitely variable transmission;
    a power recirculation mode clutch interleaved between an output member of the power recirculation mode reduction gear unit and the common output shaft, for inputting a torque greater than a torque through the unit input shaft into the continuously variable transmission when the power recirculation mode clutch is engaged;
    a torque split mode clutch interleaved between an output member of the torque split mode reduction gear unit and the common output shaft, for inputting a torque smaller than the torque through the unit input shaft into the continuously variable transmission when the torque split mode clutch is engaged;
    a direct mode clutch interleaved between the output shaft of the continuously variable transmission and the unit output shaft of the infinitely variable transmission, for inputting the torque through the unit input shaft into the continuously variable transmission when the direct mode clutch is engaged; and
    the power recirculation mode clutch, the direct mode clutch, and the torque split mode clutch being selectively engaged and disengaged for establishing either of a power recirculation mode, a direct mode, and a torque split mode.

2. The torque split infinitely variable transmission as claimed in claim 1, wherein:
    the power recirculation mode is established by engaging the power recirculation mode clutch and disengaging both the torque split mode clutch and the direct mode clutch;
    the direct mode is established by disengaging both the power recirculation mode clutch and the torque split mode clutch and engaging the direct mode clutch; and
    the torque split mode is established by engaging the torque split mode clutch and disengaging both the power recirculation mode clutch and the direct mode clutch.

3. The torque split infinitely variable transmission as claimed in claim 1, wherein:
    the output shaft of the continuously variable transmission and the power recirculation mode reduction gear unit are connected in parallel with each other;
    a torque split mode reduction gear and clutch device, including the torque split mode reduction gear unit and the torque split mode clutch, is arranged parallel to a power recirculation mode reduction gear and clutch device, including the power recirculation mode reduction gear unit and the power recirculation mode clutch.

4. The torque split infinitely variable transmission as claimed in claim 1, wherein:
    a ratio R3/R13 of a reduction ratio R3 of the power recirculation mode reduction gear unit to a reduction ratio R13 of the torque split mode reduction gear unit is set to be equal to a ratio VLow/VHigh of a maximum transmission ratio VLow of the continuously variable transmission to a minimum transmission ratio VHigh of the continuously variable transmission.

5. The torque split infinitely variable transmission as claimed in claim 1, wherein:
    the continuously variable transmission comprises a toroidal continuously variable transmission, which has input and output disks coaxially arranged and opposing each other and a direction of rotation of the output disk is reversed relative to a direction of rotation of the input disk.

6. A torque split infinitely variable transmission comprising:
    a continuously variable transmission connected to a unit input shaft of the infinitely variable transmission;

a power recirculation mode reduction gear unit connected to the unit input shaft;

a torque split mode reduction gear unit connected to the unit input shaft;

a planetary gearset comprising:
  a sun gear coupled to an output shaft of the continuously variable transmission;
  a single-planet-pinion carrier coupled to a common output shaft common to the power recirculation mode reduction gear unit and the torque split mode reduction gear unit; and
  a ring gear coupled to a unit output shaft of the infinitely variable transmission;

a power recirculation mode clutch provided in a power transmission line extending from the unit input shaft to the single-planet-pinion carrier of the planetary gearset, for inputting a torque greater than a torque through the unit input shaft into the continuously variable transmission when the power recirculation mode clutch is engaged;

a torque split mode clutch provided in the power transmission line extending from the unit input shaft to the single-planet-pinion carrier, for inputting a torque smaller than the torque through the unit input shaft into the continuously variable transmission when the torque split mode clutch is engaged;

a direct mode clutch provided in a power transmission line extending from the output shaft of the continuously variable transmission to the unit output shaft of the infinitely variable transmission, for inputting the torque through the unit input shaft into the continuously variable transmission when the direct mode clutch is engaged; and the power recirculation mode clutch, the direct mode clutch, and the torque split mode clutch being selectively engaged and disengaged for establishing either of a power recirculation mode, a direct mode, and a torque split mode.

7. A torque split infinitely variable transmission comprising:

a continuously variable transmission connected to a unit input shaft of the infinitely variable transmission;

a power recirculation mode reduction gear unit connected to the unit input shaft;

a torque split mode reduction gear unit connected to the unit input shaft;

a planetary gearset comprising:
  a sun gear coupled to an output shaft of the continuously variable transmission;
  a single-planet-pinion carrier coupled to a common output shaft common to the power recirculation mode reduction gear unit and the torque split mode reduction gear unit; and
  a ring gear coupled to a unit output shaft of the infinitely variable transmission;

a power recirculation mode clutch provided in a power transmission line extending from the unit input shaft to the single-planet-pinion carrier of the planetary gearset, for inputting a torque greater than a torque through the unit input shaft into the continuously variable transmission when the power recirculation mode clutch is engaged;

a torque split mode clutch provided in the power transmission line extending from the unit input shaft to the single-planet-pinion carrier, for inputting a torque smaller than the torque through the unit input shaft into the continuously variable transmission when the torque split mode clutch is engaged;

a direct mode clutch provided in a power transmission line extending from the output shaft of the continuously variable transmission to the unit output shaft of the infinitely variable transmission, for inputting the torque through the unit input shaft into the continuously variable transmission when the direct mode clutch is engaged;

the power recirculation mode clutch, the direct mode clutch, and the torque split mode clutch being selectively engaged and disengaged for establishing either of a power recirculation mode, a direct mode, and a torque split mode;

a reduction gearset comprising:
  an output gear of the continuously variable transmission, coaxially arranged with and rotatably supported on the unit input shaft;
  a counter gear whose rotation axis is parallel to the unit input shaft; and
  a gear fixed onto the output shaft of the continuously variable transmission, and meshingly engages via the counter gear with the output gear of the continuously variable transmission, and coaxially arranged with the sun gear of the planetary gearset;

the power recirculation mode reduction gear unit comprising:
  a first input gear coaxially arranged with the unit input shaft; and
  a first output gear in meshed-engagement with the first input gear and coaxially arranged with the single-planet-pinion carrier, the first input gear and the first output gear being provided in the power transmission line extending from the unit input shaft to the single-planet-pinion carrier; and the torque split mode reduction gear unit comprising:
  a second input gear coaxially arranged with the unit input shaft and parallel to the first input gear; and
  a second output gear in meshed-engagement with the second input gear and coaxially arranged with the single-planet-pinion carrier and parallel to the first output gear, the second input gear and the second output gear provided in the power transmission line extending from the unit input shaft to the single-planet-pinion carrier.

8. The torque split infinitely variable transmission as claimed in claim 7, wherein:

a first revolution synchronous point for switching between the power recirculation mode and the direct mode is set as a mode switching point corresponding to a maximum transmission ratio VLow of the continuously variable transmission that satisfies a first expression $VLow = R3/R1$, where R3 is a reduction ratio of the power recirculation mode reduction gear unit and R1 is a reduction ratio of the reduction gearset; and a second revolution synchronous point for switching between the direct mode and the torque split mode is set as a mode switching point corresponding to a minimum transmission ratio VHigh of the continuously variable transmission that satisfies a second expression $VHigh = R13/R1$, where R13 is a reduction ratio of the torque split mode reduction gear unit and R1 is the reduction ratio of the reduction gearset.

* * * * *